United States Patent
Aizawa et al.

(10) Patent No.: US 8,341,642 B2
(45) Date of Patent: Dec. 25, 2012

(54) INFORMATION PROCESSING APPARATUS, INFORMATION PROCESSING METHOD, PROGRAM AND INFORMATION PROCESSING SYSTEM

(75) Inventors: Hiroshi Aizawa, Tokyo (JP); Shuichi Sekiya, Saitama (JP); Daisuke Shiigi, Kanagawa (JP); Hiroshi Tobita, Kanagawa (JP); Takeshi Takeuchi, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 941 days.

(21) Appl. No.: 12/398,469

(22) Filed: Mar. 5, 2009

(65) Prior Publication Data

US 2009/0241129 A1  Sep. 24, 2009

(30) Foreign Application Priority Data

Mar. 18, 2008 (JP) ................................ 2008-070188

(51) Int. Cl.
G06F 13/00 (2006.01)
(52) U.S. Cl. ......... 719/311; 709/217; 709/219; 235/380
(58) Field of Classification Search .................. 719/311; 709/217, 219; 235/380
See application file for complete search history.

(56) References Cited

U.S. PATENT DOCUMENTS

| | | | |
|---|---|---|---|
| 7,159,770 B2 * | 1/2007 | Onozu | 235/383 |
| 7,926,713 B2 * | 4/2011 | Yamada et al. | 235/380 |
| 2006/0258337 A1 * | 11/2006 | Fujita et al. | 455/414.1 |
| 2008/0016004 A1 * | 1/2008 | Kurasaki et al. | 705/67 |
| 2009/0050691 A1 * | 2/2009 | Matsumoto | 235/379 |
| 2011/0282753 A1 * | 11/2011 | Mullen et al. | 705/14.73 |

FOREIGN PATENT DOCUMENTS

| | | |
|---|---|---|
| EP | 1 178 450 A2 | 2/2002 |
| EP | 1 178 450 A3 | 2/2002 |
| EP | 2 068 264 A2 | 6/2009 |
| JP | 60-198676 | 10/1985 |
| JP | 6-44268 | 2/1994 |
| JP | 2002-216081 | 8/2002 |
| JP | 2002-366857 | 12/2002 |

(Continued)

OTHER PUBLICATIONS

Kapil Sachdeva, et al., "A Browser-Based Approach to Smart Card Connectivity", Proc. Web 2.0 Security and Privacy Workshop (W2SP 2009) IEEE(US) May 2009, 6 pages.

"Common Markup for micropayment per-fee-links", World Wide Web Consortium, W3C Working Draft, Aug. 25, 1999, [Internet Archive: Aug. 15, 2000]. URL (Internet Archive): 35 pages.

(Continued)

*Primary Examiner* — Andy Ho
(74) *Attorney, Agent, or Firm* — Oblon, Spivak, McClelland, Maier & Neustadt, L.L.P.

(57) ABSTRACT

An IC chip in which secure information is recorded is mounted on an information processing apparatus. The information processing apparatus is connected to a service providing server for providing a service and a settlement operator server for executing a settlement concerning the service via a network. The apparatus includes a content data acquisition part that acquires content data containing a network location of a script file capable of reading the secure information in the IC chip from the service providing server, that transmits to the network location a request for the script file, and that acquires the script file from the settlement operator server based on the request. The apparatus also includes a file reading part that reads the script file, and a secure information reading part that reads the secure information from the IC chip based on a secure information access description contained in the script file.

13 Claims, 15 Drawing Sheets

FOREIGN PATENT DOCUMENTS

| | | |
|---|---|---|
| JP | 2003-109116 | 4/2003 |
| JP | 2006-59167 | 3/2006 |
| WO | WO 96/13814 | 5/1996 |
| WO | WO 97/45814 | 12/1997 |
| WO | WO 00/62174 | 10/2000 |
| WO | WO 01/18760 A1 | 3/2001 |
| WO | WO 2006/070238 A1 | 7/2006 |
| WO | WO 2009/027409 A1 | 3/2009 |

OTHER PUBLICATIONS

"Using Google Analytics to Track Google Checkout Orders", Google Inc., [online]. (c) 2008 [Internet Archive: Mar. 8, 2008]. URL (Internet Archive): 10 pages.

Decision to Refuse issued May 16, 2012 in European Patent Application No. 09 155 361.0.

* cited by examiner

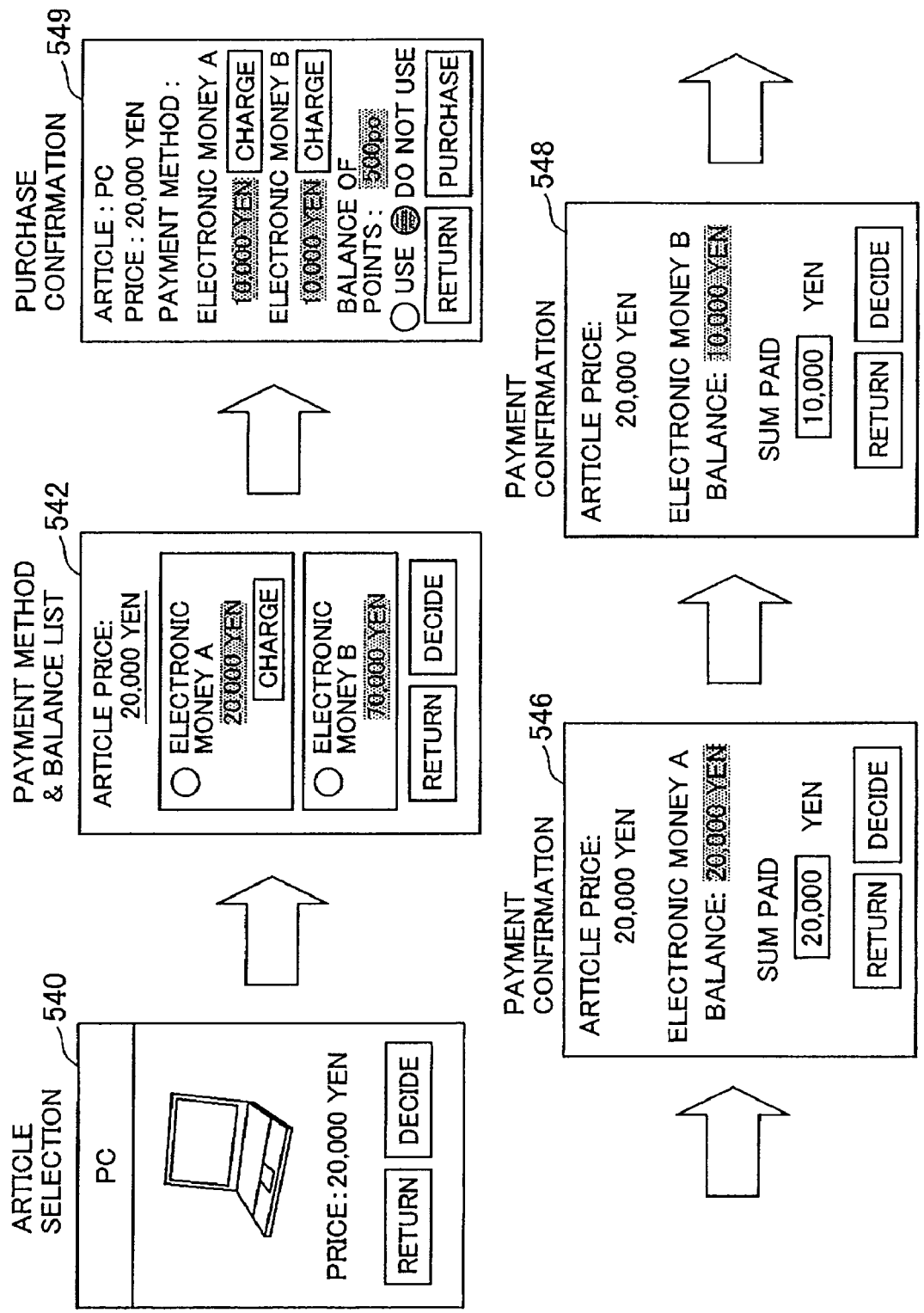

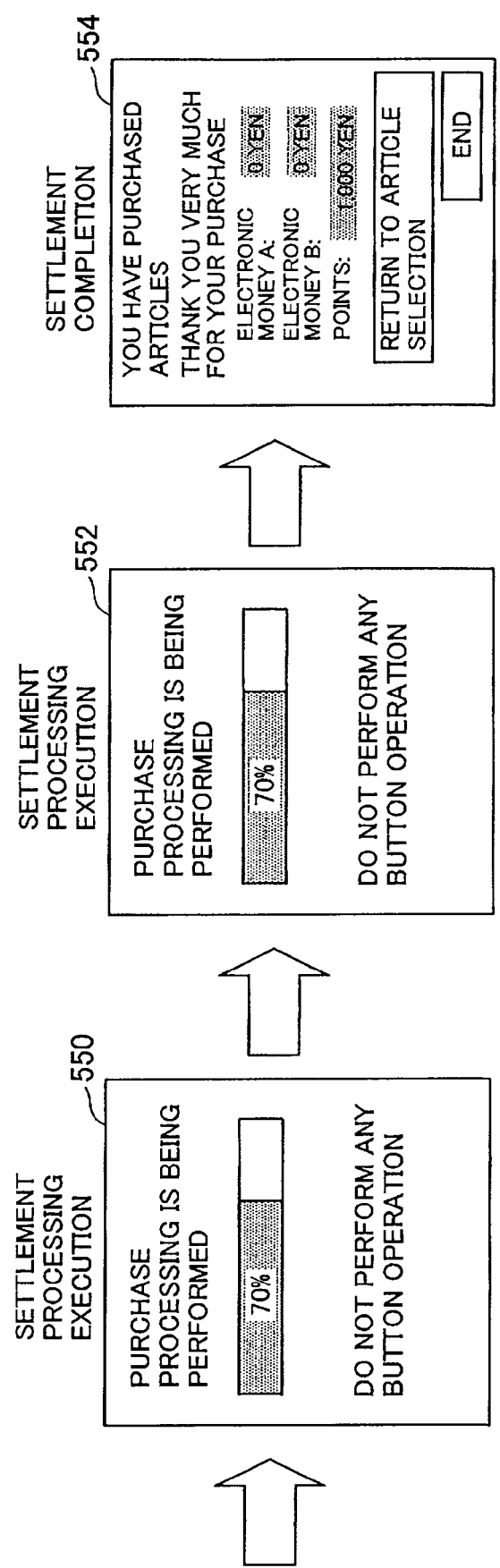

INFORMATION PROCESSING APPARATUS, INFORMATION PROCESSING METHOD, PROGRAM AND INFORMATION PROCESSING SYSTEM

CROSS REFERENCES TO RELATED APPLICATIONS

The present invention contains subject matter related to Japanese Patent Application JP 2008-070188 filed in the Japan Patent Office on JP Mar. 18, 2008, the entire contents of which being incorporated herein by reference.

BACKGROUND OF THE INVENTION

1. Field of the Invention

The present invention relates to an information processing apparatus, an information processing method, a program, and an information processing system, and in particular, relates to an information processing apparatus, an information processing method, a program, and an information processing system capable of accessing a secure chip without applications being switched on a browser.

2. Description of the Related Art

In recent years, services such as Internet shopping using electronic money are popular on mobile phones on which an IC (Integrated Circuit) chip having tamper-resistance is mounted. In such cases, electronic value such as electronic money and points available in various kinds of services is securely held in an IC chip. Secure information such as electronic value held in an IC chip can normally be read and written by an application for secure information access of an electronic settlement server or the like.

Particularly when a service operator providing a service such as Internet shopping and a settlement operator settling accounts of electronic money and the like are different, an application provided by the settlement operator needs to be started after an application provided by the service operator being started. That is, when a user does shopping using Internet shopping and settles accounts of electronic money and the like, the application of the service operator needs to be switched on a browser of a mobile phone or the like to that of the settlement operator.

[Patent Document 1] Japanese Patent Application Laid-Open No. 2003-109116

[Patent Document 2] Japanese Patent Application Laid-Open No. 6-44268

[Patent Document 3] Japanese Patent Application Laid-Open No. 60-198676

SUMMARY OF THE INVENTION

However, if it is necessary to access an IC chip in which secure information such as electronic money is recorded while an application providing a service such as Internet shopping is running, there is an issue that switching to an application for secure chip access occurs and a wait time until the application is started up is created. In this case, a service operator may construct an application to access secure information so as to make application switching unnecessary. However, if the user uses electronic money or the like of a plurality of settlement operators, the service operator needs to have information for accessing secure information disclosed by each of the settlement operators, posing an issue in terms of security.

Thus, the present invention has been developed in view of the above issues and there is a need for a new and improved information processing apparatus, information processing method, program, and information processing system capable of accessing a secure chip without applications being switched on a browser.

According to an embodiment of the present invention, there is provided an information processing apparatus on which an IC chip in which secure information is recorded is mounted and which is connected to a service providing server for providing a service to a user and a settlement operator server for executing a settlement concerning the service via a network, including a content data acquisition part for acquiring content data containing location information of a script file capable of reading secure information in the IC chip from the service providing server; a file reading part for reading the script file from the settlement operator server based on the location information of the script file contained in the content data acquired by the content data acquisition part; and a secure information reading part for reading the secure information from the IC chip based on a secure information access description contained in the script file read by the file reading part.

According to such a configuration, a script file for secure information access is acquired from a settlement operator server based on location information contained in content data acquired from a service providing server and secure information is accessed based on a secure information access description of the script file. Accordingly, the script file for secure information access held by the settlement operator server can be acquired and executed without applications being switched on a browser of an information processing apparatus. Therefore, a starting time for starting up an application is made unnecessary so that processing from service provision such as Internet shopping to electronic money settlements can seamlessly be performed.

Also, a display part for displaying the secure information in the IC chip read by the secure information reading part may be provided. According to such a configuration, the secure information recorded in the IC chip can be displayed on a browser of the information processing apparatus to display content of secure information to a user.

Also, an interpretation part for interpreting the secure information access description contained in the script file may be provided, wherein the secure information reading part may read the secure information from the IC chip based on an interpretation of the secure information access description by the interpretation part. According to such a configuration, the interpretation part interprets the secure information access description contained in the script file to read the secure information. Accordingly, the secure information in the IC chip accessible only by the settlement operator server can be read while ensuring security.

A settlement operator server identification part for identifying the settlement operator server on which the script file is stored from the location information of the script file contained in the content information acquired by the content data acquisition part may be provided. According to such a configuration, the settlement operator server associated with the location information of the script file can be identified. Accordingly, even if a plurality of operator servers is connected to a network, one settlement operator server can be identified.

According to another embodiment of the present invention, there is provided a information processing method of an information processing apparatus on which an IC chip in which secure information is recorded is mounted and which is connected to a service providing server for providing a service to a user and a settlement operator server for executing a settlement concerning the service via a network, including the steps of: acquiring content data containing location information of a script file capable of reading secure information in the IC chip from the service providing server; reading the script file from the settlement operator server based on the location information of the script file contained in the acquired content data; and reading the secure information from the IC chip based on a secure information access description contained in the read script file.

According to another embodiment of the present invention, there is provided a program for causing a computer to function as an information processing apparatus on which an IC chip in which secure information is recorded is mounted and which is connected to a service providing server for providing a service to a user and a settlement operator server for executing a settlement concerning the service via a network, including: a content data acquisition part for acquiring content data containing location information of a script file capable of reading secure information in the IC chip from the service providing server; a file reading part for reading the script file from the settlement operator server based on the location information of the script file contained in the content data acquired by the content data acquisition part; and a secure information reading part for reading the secure information from the IC chip based on a secure information access description contained in the script file read by the file reading part.

According to another embodiment of the present invention, there is provided an information processing system in which an information processing apparatus on which an IC chip in which secure information is recorded is mounted, a service providing server for providing a service to a user and a settlement operator server for executing a settlement concerning the service are connected via a network. The service providing server includes a content data providing part for providing content data containing location information of a script file capable of reading the secure information in the IC chip to the information processing apparatus in accordance with a request of the information processing apparatus.

The information processing apparatus includes a content data acquisition part for acquiring the content data provided by the content data providing part; a file reading part for reading the script file from the settlement operator server based on the location information of the script file contained in the content data acquired by the content data acquisition part; and a secure information reading part for reading the secure information from the IC chip based on a secure information access description contained in the script file read by the file reading part. The settlement operator server includes a secure information update part for updating the secure information read by the secure information reading part.

According to another embodiment of the present invention, there is provided an information processing apparatus on which an IC chip in which secure information is recorded is mounted and which is connected to a service providing server for providing a service to a user and a plurality of settlement operator servers for executing a settlement concerning the service via a network, including: a content data acquisition part for acquiring content data containing location information of a plurality of script files capable of reading secure information in the IC chip from the service providing server; a file reading part for reading the plurality of script files from the plurality of settlement operator servers based on the location information of the plurality of script files contained in the content data acquired by the content data acquisition part; a secure information reading part for reading a plurality of pieces of the secure information from the IC chip based on a secure information access description contained in the plurality of script files read by the file reading part; and a display part for displaying the plurality of pieces of the secure information read by the secure information reading part in one screen in order.

According to such a configuration, a script file for secure information access is acquired from a settlement operator server based on location information contained in content data acquired from a service providing server and secure information is accessed based on a secure information access description of the script file. Accordingly, the script file for secure information access held by the settlement operator server can be acquired and executed without applications being switched on a browser of an information processing apparatus. Therefore, a starting time for starting up an application is made unnecessary so that processing from service provision such as Internet shopping to electronic money settlements can seamlessly be performed.

Further, according to the present embodiment, the service providing server can use settlement processing by the plurality of settlement operator servers without constructing a service or a system in which applications corresponding to settlement processing of the plurality of settlement operator servers are embedded. Moreover, settlement processing by the plurality of settlement operator servers can be performed without applications being switched on the browser of the information processing apparatus and information about the plurality of types of electronic money can be displayed in order on the browser.

A location information selection part for selecting location information of one or more of the script files from the location information of the plurality of script files contained in the content data in accordance with a user entry may be provided, wherein the file reading part may read one or more pieces of the secure information from the IC chip based on the location information of one or more of the script files selected by the location information selection part. According to such a configuration, when the content data contains location information of the plurality of script files, desired location information can be selected by a user entry or the like. Accordingly, when the content data contains location information of the plurality of script files and all script files need not be acquired, only desired location information can be acquired so that settlement processing can be performed swiftly.

The IC chip has the plurality of pieces of secure information, each updatable by the plurality of settlement operator servers, recorded therein and the information processing apparatus may include a secure information selection part for selecting one or more pieces of the secure information from the plurality of secure information displayed in the display part in accordance with a user entry so that one or more pieces of the secure information selected by the secure information selection part may be updated by the settlement operator servers. According to such a configuration, a plurality of secure information is displayed in the display part so that desired secure information can be selected from the plurality of secure information. Accordingly, desired secure information is selected in accordance with a user entry and settlement processing by more convenient electronic money can be performed.

According to another embodiment of the present invention, there is provided an information processing method of an information processing apparatus on which an IC chip in which secure information is recorded is mounted and which is connected to a service providing server for providing a service to a user and a plurality of settlement operator servers for executing a settlement concerning the service via a network, including the steps of: acquiring content data containing location information of a script file capable of reading secure information in the IC chip from the service providing server; reading the plurality of script files from the plurality of settlement operator servers based on the location information of the plurality of script files contained in the acquired content data; reading a plurality of pieces of the secure information from the IC chip based on a secure information access description contained in the plurality of read script files; and displaying the plurality of pieces of the read secure information in one screen in order.

According to another embodiment of the present invention, there is provided a program for causing a computer to function as an information processing apparatus on which an IC chip in which secure information is recorded is mounted and which is connected to a service providing server for providing a service to a user and a plurality of settlement operator servers for executing a settlement concerning the service via a network, including: a content data acquisition part for acquiring content data containing location information of a plurality of script files capable of reading secure information in the IC chip from the service providing server; a file reading part for reading the plurality of script files from the plurality of settlement operator servers based on the location information of the plurality of script files contained in the content data acquired by the content data acquisition part; a secure information reading part for reading a plurality of pieces of the secure information from the IC chip based on a secure information access description contained in the plurality of script files read by the file reading part; and a display part for displaying the plurality of pieces of the secure information read by the secure information reading part in one screen in order.

According to another embodiment of the present invention, there is provided a settlement system in which an information processing apparatus on which an IC chip in which secure information is recorded is mounted, a service providing server for providing a service to a user and a settlement operator server for executing a settlement concerning the service are connected via a network. The service providing server includes a content data providing part for providing content data containing location information of a plurality of script files capable of reading the secure information in the IC chip to the information processing apparatus in accordance with a request of the information processing apparatus.

The information processing apparatus includes a content data acquisition part for acquiring the content data provided by the content data providing part; a file reading part for reading the plurality of script files from the plurality of settlement operator servers based on the location information of the plurality of script files contained in the content data acquired by the content data acquisition part; a secure information reading part for reading a plurality of pieces of the secure information from the IC chip based on a secure information access description contained in the plurality of script files read by the file reading part, and a display part for displaying the plurality of pieces of the secure information read by the secure information reading part in one screen in order.

The settlement operator server includes a secure information update part for updating one or more pieces of the secure information selected in accordance with a user entry from secure information displayed in the display part.

According to the embodiments of the present invention, a secure chip can be accessed without applications being switched on a browser.

BRIEF DESCRIPTION OF THE DRAWINGS

FIG. 14 is an explanatory view illustrating the display screen displayed on the browser of the information processing apparatus according to the second embodiment; and FIG. 15 is an explanatory view illustrating the display screen displayed on the browser of the information processing apparatus according to the second embodiment.

DETAILED DESCRIPTION OF THE PREFERRED EMBODIMENTS

Figure 1:
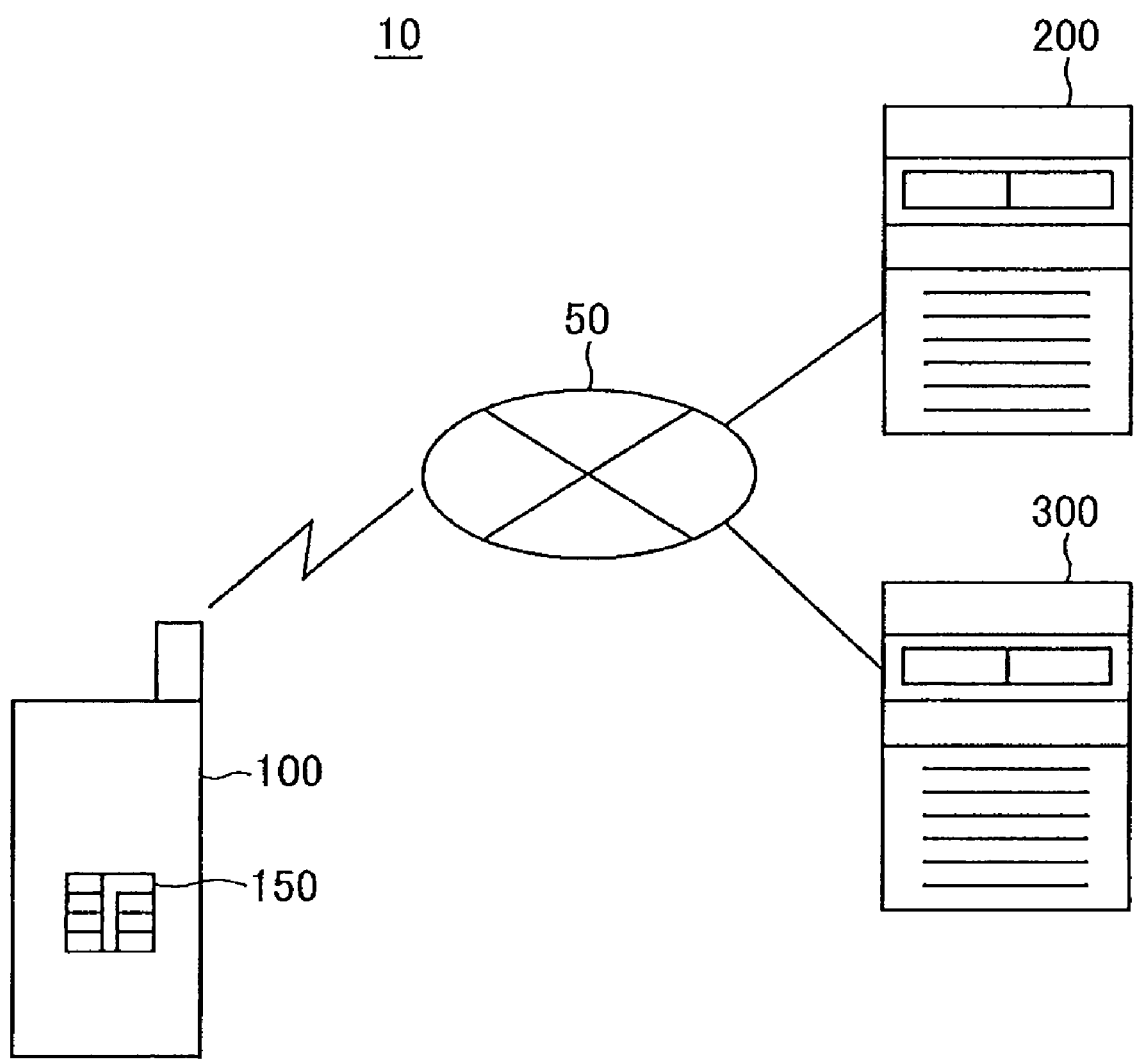
FIG. 1 is an explanatory view showing a configuration example of an information processing system according to a first embodiment of the present invention.

Hereinafter, preferred embodiments of the present invention will be described in detail with reference to appended drawings. Note that, in this specification and the appended drawings, structural elements that have substantially the same function and structure are denoted with the same reference numerals, and repeated explanation of these structural elements is omitted.

First Embodiment

First, an overview of an information processing system according to the first embodiment of the present invention will be provided. FIG. 1 is an explanatory view showing a configuration example of an information processing system 10 according to the present embodiment. As shown in FIG. 1, the information processing system 10 includes an information processing apparatus 100, a service providing server 200 and a settlement operator server 300. The information processing apparatus 100, the service providing server 200 and the settlement operator server 300 are connected via a network 50. The network 50 is, for example, a public network such as the Internet, a telephone network, and satellite network or a private network such as a WAN, LAN, and IP-VPN and it does not matter whether the network uses cable or wireless.

The information processing apparatus 100 is a mobile terminal on which an IC chip 150 is mounted. As an example of the information processing apparatus 100, a mobile phone on which the IC chip 150 is mounted will be described by applying the mobile phone to an information processing apparatus of the present invention below, but the information processing apparatus is not limited to this example. The information processing apparatus 100 may also be, for example, a PDA (Personal Digital Assistant), wrist watch, or mobile music player on which an IC chip is mounted.

The IC chip 150 mounted on the information processing apparatus 100 may be a contact communicable IC chip or a non-contact communicable IC chip. The IC chip 150 is a secure memory having tamper-resistance. The information processing apparatus 100 may have a plurality of IC chips mounted thereon so that each IC chip is used differently in accordance with each purpose. The information processing apparatus 100 on which an IC chip in which electronic value such as electronic money and points, tickets, and coupons available in various kinds of services is mainly recorded is mounted will be described below as an example.

The service providing server 200 is connected to the information processing apparatus 100 via the network 50 and transmits content data that can execute services provided by the service providing server 200 in response to a request from the information processing apparatus 100. More specifically, the service providing server 200 transmits content data containing location information of a script file capable of reading secure information in the IC chip 150 to the information processing apparatus 100 in response to a request from the information processing apparatus 100.

Secure information written in the IC chip 150 is information that may not be acquired by decryption even by the information processing apparatus 100 itself. Secure information written in the IC chip 150 is made accessible by a device having an application capable of encrypting/decrypting the secure information. The application capable of accessing the IC chip 150 is a program capable of decrypting secure information recorded in the IC chip 150 and encrypting and writing information.

The settlement operator server 300 is connected to the information processing apparatus 100 via the network 50 and transmits a script file capable of reading secure information in the IC chip 150 in response to a request from the information processing apparatus 100. As described above, content data transmitted by the service providing server 200 contains location information of a script file capable of reading secure information in the IC chip 150. The information processing apparatus 100 accesses the settlement operator server 300 specified by location information contained in content data to acquire a script file capable of reading secure information. The script file contains a secure information access description for accessing secure information recorded in the IC chip 150. The information processing apparatus 100 executes the script based on the secure information access description to read secure information from the IC chip 150.

To access secure information in the IC chip 150 mounted on the information processing apparatus 100, it is normally necessary to start an application for secure information access. That is, if the service providing server 200 does not have any application for secure information access, it is necessary to suspend execution of an application such as Internet shopping provided by the service providing server 200 and to start an application to use settlements using secure information recorded in the IC chip 150 provided by the settlement operator server 300. In this case, it is necessary to switch applications on the browser of the information processing apparatus 100, posing an issue that it takes time to start an application to access secure information.

However, according to the information processing system 10, a script file for secure information access is acquired from the settlement operator server 300 based on location information contained in content data acquired from the service providing server 200 to access secure information based on a secure information access description in the script file. Accordingly, the script file for secure information access held by the settlement operator server 300 can be acquired and executed without applications being switched on a browser of the information processing apparatus 100. Therefore, a starting time for starting up an application is made unnecessary so that processing from service provision such as Internet shopping to electronic money settlements can seamlessly be performed.

This concludes a description of an overview of the information processing system 10. Next, a detailed configuration of the information processing apparatus 100, the service providing server 200 and the settlement operator server 300 of the information processing system 10 according to the present embodiment will be described.

Figure 2:
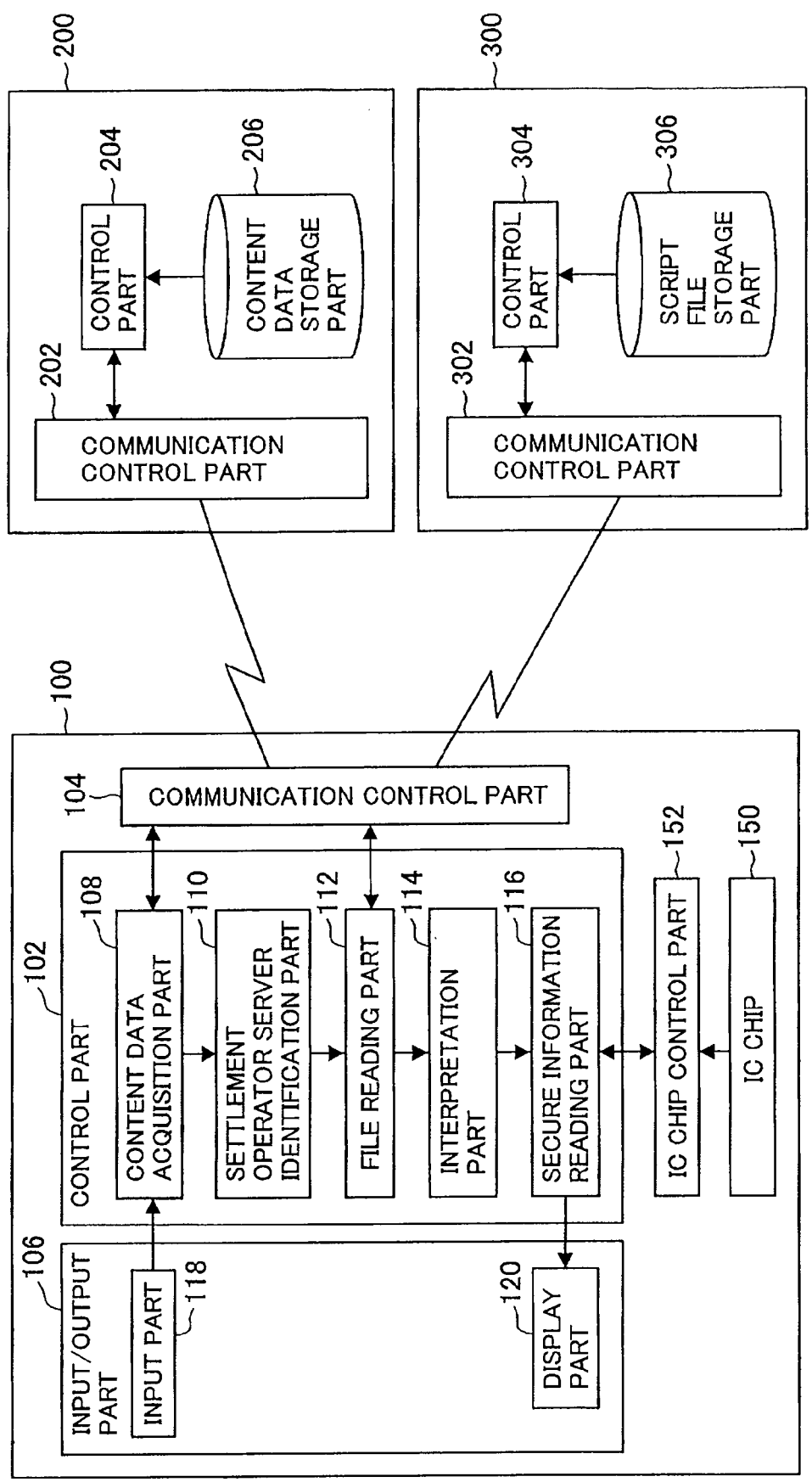
FIG. 2 is a block diagram showing a function configuration of an information processing apparatus, a service providing server, and a settlement operator server according to the first embodiment.

FIG. 2 is a block diagram showing the function configuration of the information processing apparatus 100, the service providing server 200 and the settlement operator server 300. As shown in FIG. 2, the information processing apparatus 100 includes a control part 102, a communication control part 104, an input/output part 106, the IC chip 150, and an IC chip control part 152.

The control part 102 has a function to control the information processing apparatus 100 by a program in the information processing apparatus 100 and includes a content data acquisition part 108, a settlement operator server identification part 110, a file reading part 112, an interpretation part 114, and a secure information reading part 116. The content data acquisition part 108 has a function to acquire content data capable of executing a service provided by the service providing server 200 from the service providing server 200 via the communication control part 104. Content data to be acquired is, for example, content data containing location information of a script file capable of reading secure information in the IC chip 150. The content data acquisition part 108 provides the acquired content data to the settlement operator server identification 110.

The settlement operator server identification part 110 has a function to identify the settlement operator server 300 on which a script file is stored from location information of the script file contained in content data provided by the content data acquisition part 108. A plurality of the settlement operator servers 300 may be connected to the network 50. In such a case, the settlement operator server identification part 110 identifies one settlement operator server 300 from location information of the script file. The settlement operator server identification part 110 provides information of the identified settlement operator server to the file reading part 112.

The file reading part 112 has a function to read a script file from the settlement operator server 300 via the communication control part 104 based on information about the settlement operator server provided to the settlement operator server identification part 110. The file reading part 112 provides the read script file to the interpretation part 114.

The interpretation part 114 has a function to interpret a secure information access description contained in the script file. Then, the secure information reading part 116 has a function to read secure information from the IC chip 150 based on the secure information access description interpreted by the interpretation part 114. Secure information stored in the IC chip 150 is stored after being encrypted. Thus, the control part 102 is configured in such a way that secure information stored in the IC chip 150 may not be read without a function to decrypt encrypted secure information. A script file read from the settlement operator server 300 contains a secure information access description enabling access to secure information. Thus, secure information in the IC chip 150 can be accessed by interpreting and executing the secure information access description.

An IC chip control part 140 has a function to exchange data between the IC chip 150 and the control part 102 and the communication control part 104 of the information processing apparatus 100. The IC chip 150 is mounted on the information processing apparatus 100, has a function to perform contact communication or non-contact communication with external devices, and is a secure memory having tamper-resistance. The IC chip 150 may contain a CPU (Central Processing Unit), a ROM (Read Only Memory), RAM (Random Access Memory), or a storage part. In the present embodiment, the IC chip 150 mainly having a storage part with secure information recorded therein will be described.

The input/output part 106 is an interface of input and output provided with the information processing apparatus 100. An input part 118 is an interface having a function to accept input and can exemplify, for example, a ten-key, buttons, or a touch-panel. A display part 120 is an output interface and can exemplify, for example, a display representation or a display device such as a lamp.

Next, the function configuration of the service providing server 200 will be described. The service providing server 200 includes a communication control part 202, a control part 204, and a content data storage part 206. The communication control part 202 is a communication interface including a communication device for connecting to a network such as the Internet and has a function to transmit and receive data to/from the information processing apparatus 100 via a network.

The control part 204 has a function to control the service providing server 200 by a program in the service providing server 200 and may also function, for example, as a content data providing part to provide content data recorded in the content data storage part 206 to the information processing apparatus 100 in accordance with a request from the information processing apparatus 100. Content data recorded in the content data storage part 206 contains location information of a script file capable of reading secure information in the IC chip 150.

Content data provided by the service providing server 200 is, for example, content data capable of providing a service such as Internet shopping and can show, for example, a Web page described in HTML (Hyper Text Markup Language) or the like. A user of the information processing apparatus 100 can peruse a Web page provided by the service providing server 200 on a browser of the information processing apparatus 100. If the Web page is a page providing a service concerning Internet shopping, the user can select articles to be purchased and a payment method following instructions of the Web page on the browser. This concludes a description of the function configuration of the service providing server 200.

Next, the function configuration of the settlement operator server 300 will be described. The settlement operator server 300 includes a communication control part 302, a control part 304, and a script file storage part 306. The communication control part 302 is a communication interface including a communication device for connecting to a network such as the Internet and has a function to transmit and receive data to/from the information processing apparatus 100 via a network.

The control part 304 has a function to control the settlement operator server 300 by a program in the settlement operator server 300 and may also function, for example, as a script file providing part to provide a script file recorded in the script file storage part 306 to the file reading part 112 of the information processing apparatus 100 in accordance with a request from the information processing apparatus 100. The control part 304 may also function as a secure information update part to update secure information in the IC chip 150 read by the secure information reading part 116 of the information processing apparatus 100. A script file recorded in the script file storage part 306 contains a secure information access description for accessing secure information in the IC chip 150.

The settlement operator server 300 can show, for example, a server of an electronic money settlement operator. When secure information about electronic money is recorded in the IC chip 150, the secure information can normally be read or written only by the server of the electronic money settlement operator. That is, in the information processing apparatus 100, it is necessary for the settlement operator server 300 to start an application to access secure information. When a user of the information processing apparatus 100 purchases articles using a Web page provided by the service providing server 200 and then settles accounts using secure information of electronic money or the like recorded in the IC chip 150, it is necessary to switch to an application to access secure information on a Web browser.

However, in the present embodiment, content data provided by the service providing server 200 contains location information of a script file to access secure information in the IC chip 150 so that the script file can be read from the settlement operator server 300 based on the location information. Accordingly, it becomes possible to use a service from the service providing server 200 and to access secure information without any need to switch the screen or application on the Web browser of the information processing apparatus 100. Moreover, a waiting time such as a starting time of an application to access secure information does not arise so that seamless processing for a user of the information processing apparatus 100 can be realized. This concludes a description of the function configuration of the settlement operator server 300.

Figure 3:
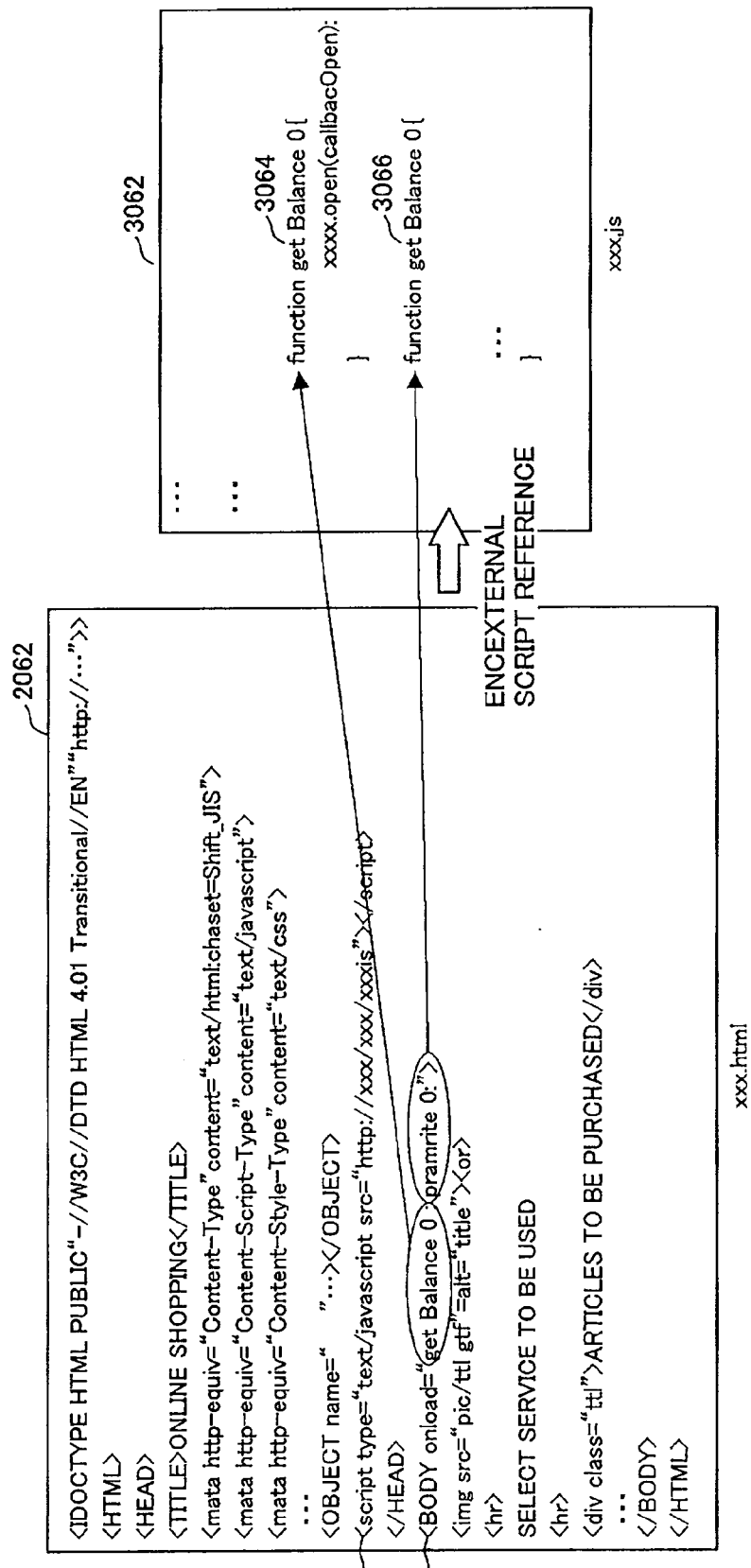
FIG. 3 is an explanatory view illustrating content data and a script file according to the first embodiment.

Next, content data provided by the service providing server 200 and a script file provided by the settlement operator server 300 will be described based on FIG. 3. FIG. 3 is an explanatory view illustrating content data and a script file. As shown in FIG. 3, content data 2062 recorded in content data storage part includes a script tag 2064, a body tag 2066 and the like.

The script tag 2064 is a tag used for describing a script and a URL of an external script file can be specified by "SRC=". By describing "onload" in the body tag 2066, some kind of processing can be made to perform when a page is read. By describing <body onload="...">, a script file can be invoked when the page is read.

The information processing apparatus 100 acquires the content data 2062 and then, the content data 2062 is expanded on the browser of the information processing apparatus 100 as a Web page. As described above, the content data 2062 has a description to invoke an external script. Accordingly, when a Web page is read into the information processing apparatus 100, a script file held by the settlement operator server 300 is invoked based on a script file invocation instruction embedded in the content data 2062 and location information of the script file. This concludes a description of content data and a script file.

Figure 4:
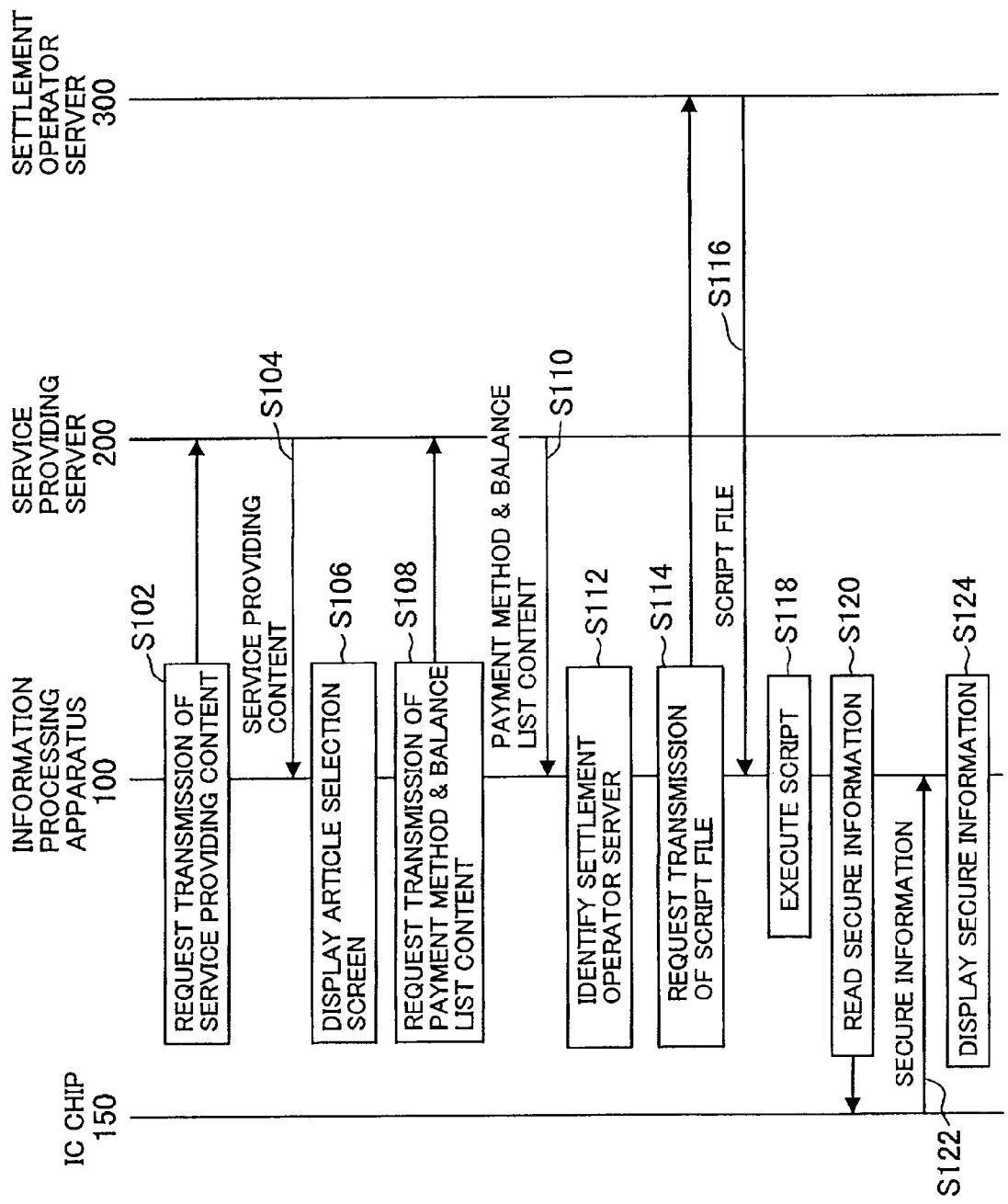
FIG. 4 is a timing chart showing the flow of processing from service provision to settlement completion in the information processing system according to the first embodiment.
Figure 5:
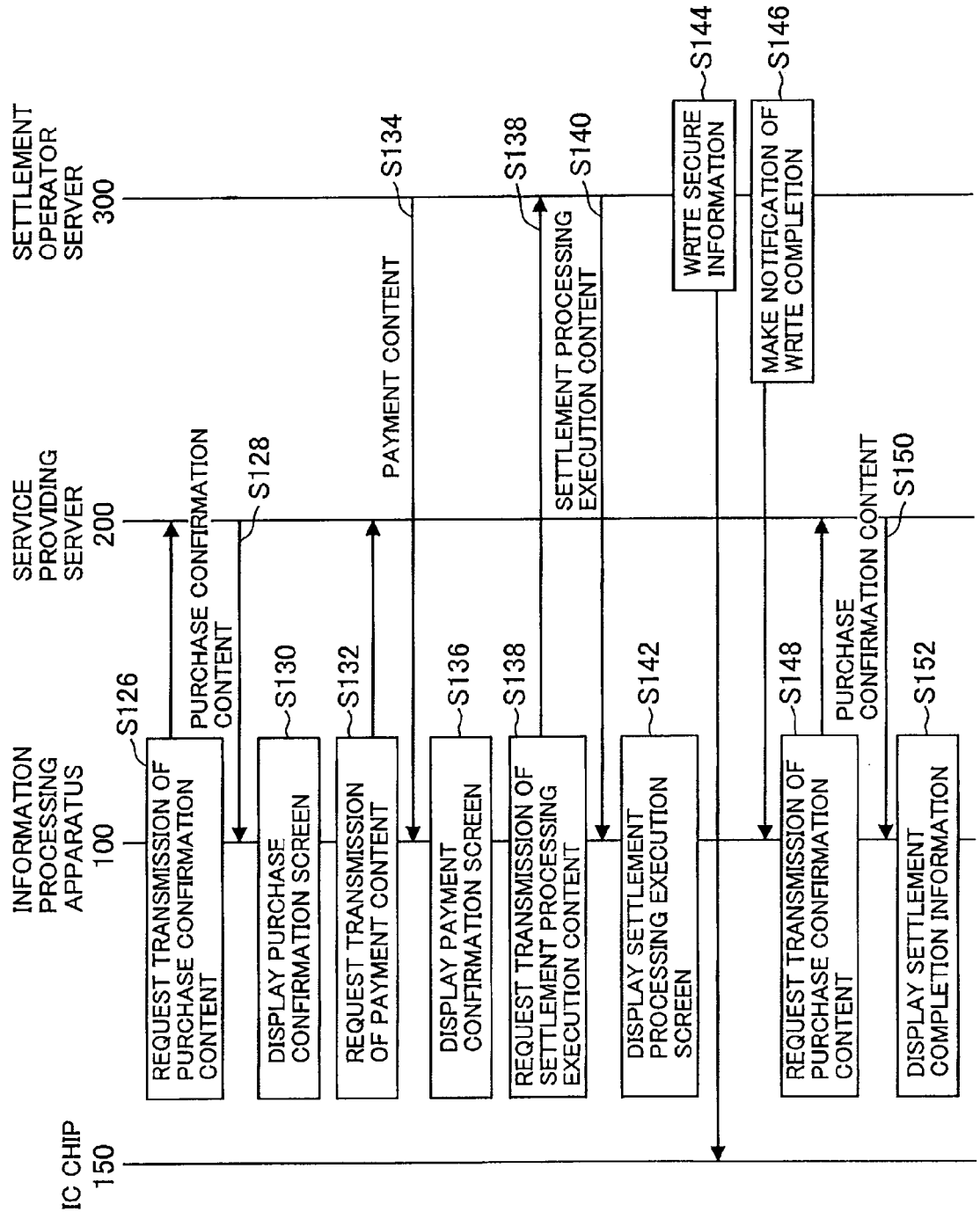
FIG. 5 is a timing chart showing the flow of processing from service provision to settlement completion in the information processing system according to the first embodiment.

Next, the flow of processing from service provision to settlement completion in the information processing apparatus 100 will be described based on FIG. 4 and FIG. 5. FIG. 4 and FIG. 5 are timing charts showing the flow of processing from service provision to settlement completion in the information processing apparatus 100. As shown in FIG. 4, the information processing apparatus 100 first requests transmission of service providing content from the service providing server 200 (S102). Service providing content requested at step S102 is an example of content data and content data concerning the service provided by the service providing server 200 and, for example, an article list page of Internet shopping.

The service providing server 200, from which transmission of service providing content is requested by the information processing apparatus 100 at step S102, acquires the requested service providing content from the content data storage part 206 and provides the service providing content to the information processing apparatus 100 (S104). The information processing apparatus 100, to which content data is provided at step S104, displays an article selection screen in the display part 120 (hereinafter, also called a browser) (S106). The display screen displayed on the browser of the information processing apparatus 100 will be described later.

Next, the information processing apparatus 100 requests transmission of payment method and balance list content from the service providing server 200 (S108). The payment method and balance list content requested at step S108 are an example of content data and content data concerning the service provided by the service providing server 200. The service providing server 200, from which transmission of content data is requested by the information processing apparatus 100 at step S108, acquires the requested content data from the content data storage part 206 and provides the content data to the information processing apparatus 100 (S110). The content data provided to the information processing apparatus 100 at step S110 contains location information of a script file capable of reading secure information in the IC chip 150 of the information processing apparatus 100. Based on the location information of the script file, the information processing apparatus 100 identifies the settlement operator server 300 (S112).

Then, the information processing apparatus 100 requests transmission of the script file from the settlement operator server 300 identified at step S112 (S114). The settlement operator server 300, from which transmission of the script file is requested by the information processing apparatus 100 at step S114, provides the script file recorded in the script file storage part 306 to the information processing apparatus 100 (S116). The information processing apparatus 100, to which the script file is provided at step S116, executes the script (S118).

The information processing apparatus 100, which executes the script at step S118, interprets a secure information access description contained in the script file to read secure information in the IC chip 150 (S120). The information processing apparatus 100, which reads secure information in the IC chip 150 at step S120, acquires the secure information from the IC chip 150 (S122). The information processing apparatus 100, which acquires the secure information at step S122, displays the secure information on the browser (S124).

Next, as shown in FIG. 5, the information processing apparatus 100 requests transmission of purchase confirmation content to check with the user to confirm the purchase (S126). The service providing server 200, from which transmission of purchase confirmation content is requested by the information processing apparatus 100 at step S126, transmits purchase confirmation content recorded in the content data storage part 206 to the information processing apparatus 100 (S128). The information processing apparatus 100, to which purchase confirmation content is transmitted by the service providing server 200 at step S128, displays a purchase confirmation screen on the browser (S130).

Then, the information processing apparatus 100 requests transmission of payment content from the settlement operator server 300 (S132). The settlement operator server 300, from which transmission of payment content is requested at step S132, provides payment content to the information processing apparatus 100 (S134). The information processing apparatus 100, to which payment content is provided by the settlement operator server 300 at step S134, displays a payment confirmation screen on the browser (S136).

Then, the information processing apparatus 100 requests transmission of settlement processing execution content from the settlement operator server 300 (S138). The settlement operator server 300, from which transmission of settlement processing execution content is requested at step S138, provides settlement processing execution content to the information processing apparatus 100 (step S140). The information processing apparatus 100, to which settlement processing execution content is provided by the settlement operator server 300 at step S140, displays a settlement processing execution screen on the browser (S142).

The settlement operator server 300, which transmits settlement processing execution content to the information processing apparatus 100 at step S140, writes secure information into the IC chip 150 (S144). The writing of secure information performed at step S144 is an update of electronic money or the like and settlement processing is thereby performed. Then, the settlement operator server 300 notifies the information processing apparatus 100 that the writing of secure information has been completed (S146).

The information processing apparatus 100 notified of completion of the writing of secure information at step S146 requests transmission of purchase confirmation content from the service providing server 200 (S148). The service providing server 200, from which transmission of purchase confirmation content is requested by the information processing apparatus 100 at step S148, transmits purchase confirmation content to the information processing apparatus 100 (S150). The information processing apparatus 100, to which purchase confirmation content is transmitted at step S150, displays a settlement completion screen on the browser (S152). This concludes a description of the flow of processing from service provision to settlement completion in the information processing system 10.

Figure 6:
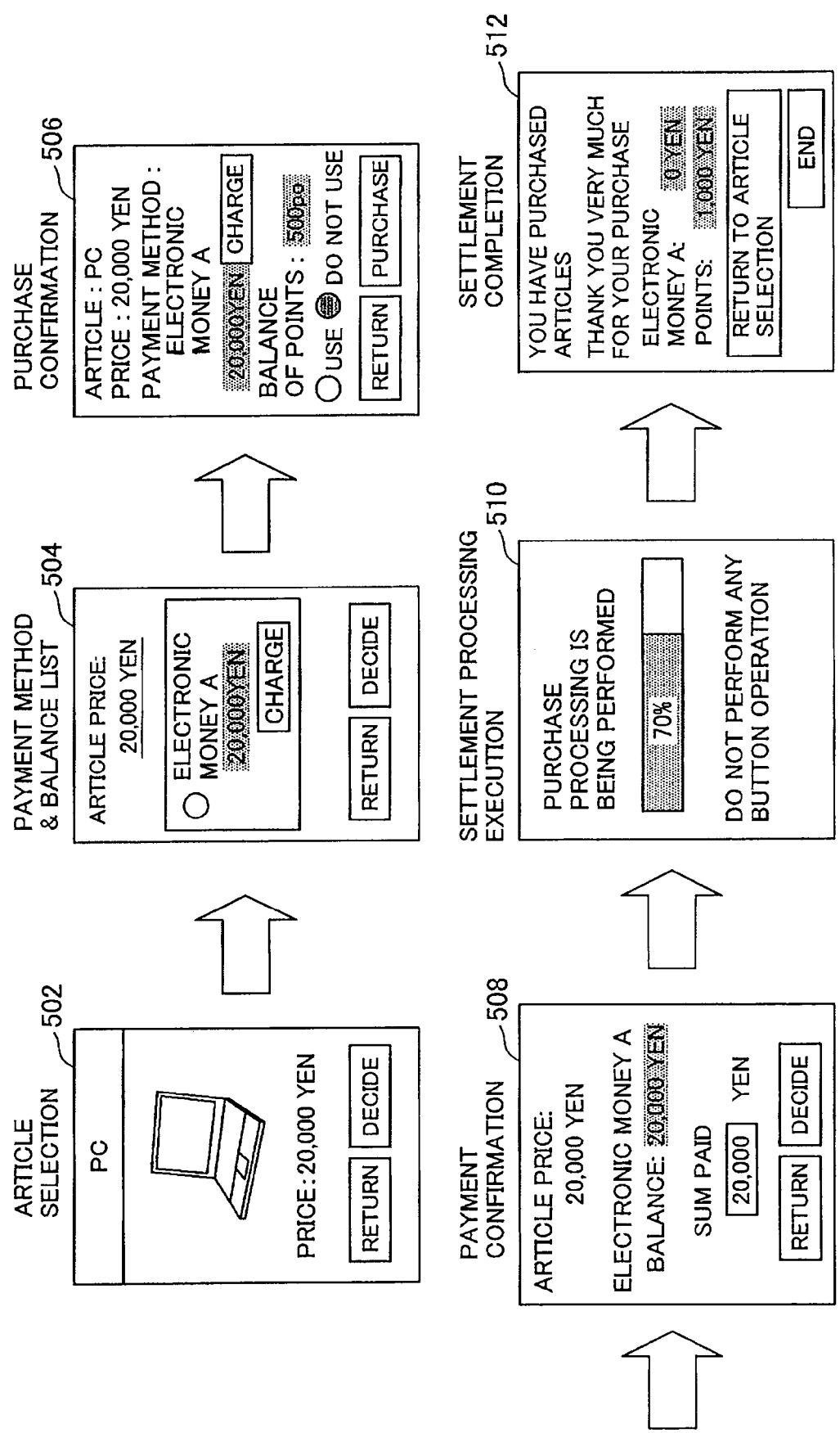
FIG. 6 is an explanatory view illustrating a display screen displayed on a browser of the information processing apparatus according to the first embodiment.

Next, display screens displayed in the display part 120 (browser) of the information processing apparatus 100 will be described based on FIG. 6. FIG. 6 is an explanatory view illustrating the display screens displayed on the browser of the information processing apparatus 100. Service providing content such as Internet shopping is displayed on the browser of the information processing apparatus 100 and an article selection screen 502 is displayed. In the article selection screen 502, for example, images of PCs to be articles for selection, prices of PCs and the like are displayed.

If, after the article selection screen 502 being displayed, an entry to decide purchase of an article is made by an entry of a user of the information processing apparatus 100, a payment method and balance list screen 504 is displayed. The payment method is, for example, the type of electronic money, and the type of electronic money used by the user and the balance of the electronic money are displayed. If, after the payment method and balance list screen 504 being displayed, a decision entry of the payment method is made by an entry of the user, a purchase confirmation screen 506 is displayed. In the purchase confirmation screen 506, for example, the name of an article, price of the article, payment method and the like are displayed. If, in addition to electronic money, points, coupons and the like are used, the balance of points and the like are displayed.

If, after the purchase confirmation screen 506 being displayed, an entry to decide purchase is made by an entry of the user, a payment confirmation screen 508 is displayed. In the payment confirmation screen 508, for example, the price of an article, type of electronic money to be used, balance of the electronic money, sum paid and the like are displayed. If, after the payment confirmation screen 508 being displayed, an entry to decide payment confirmation is made by an entry of the user, a settlement processing execution screen 510 is displayed. In the settlement processing execution screen 510, execution progress of purchase processing, warnings against entries by the user and the like are displayed.

When settlement processing is completed, a settlement completion screen 512 is displayed. In the settlement completion screen 512, a display that an article has been purchased is made and also the balance of electronic money, balance of points and the like are displayed to notify the user that payments are completed. This concludes a description of display screens displayed in the display part 120 of the information processing apparatus 100.

In the foregoing, the information processing system 10 according to the first embodiment has been described. According to the information processing system 10, a script file for secure information access is acquired from the settlement operator server 300 based on location information contained in content data acquired from the service providing server 200 to access secure information based on a secure information access description of the script file. Accordingly, the script file for secure information access held by the settlement operator server 300 can be acquired and executed without applications being switched on the browser of the information processing apparatus 100. Therefore, a starting time for starting up an application is made unnecessary so that processing from service provision such as Internet shopping to electronic money settlements can seamlessly be performed. This concludes a description of the first embodiment.

The first embodiment is described by illustrating a case in which the number of the settlement operator servers 300 is one and the number of types of electronic money used by the user is one. Nowadays, however, the number of the settlement operator servers 300 for value settlement of electronic money and the like is not limited to one operator and also a plurality of types of electronic money in use exists. Thus, the second embodiment will be described by illustrating a case in which a plurality of the settlement operator servers 300 is connected to a network and a plurality of types electronic money is used.

Second Embodiment

First, an overview of an information processing system according to the second embodiment of the present invention will be provided. As described above, the plurality of the settlement operator servers 300 is connected to a network and the user can perform settlement processing by using the plurality of types electronic money. Also in the present embodiment, like the first embodiment, processing from service provision such as Internet shopping to electronic money settlements can seamlessly be performed. Further, in the present embodiment, it becomes possible to display balances of the plurality of types electronic money on one browser and to settle accounts of the plurality of types of electronic money without applications being switched. Accordingly, settlement processing by electronic money more convenient for the user can be realized.

Figure 7:
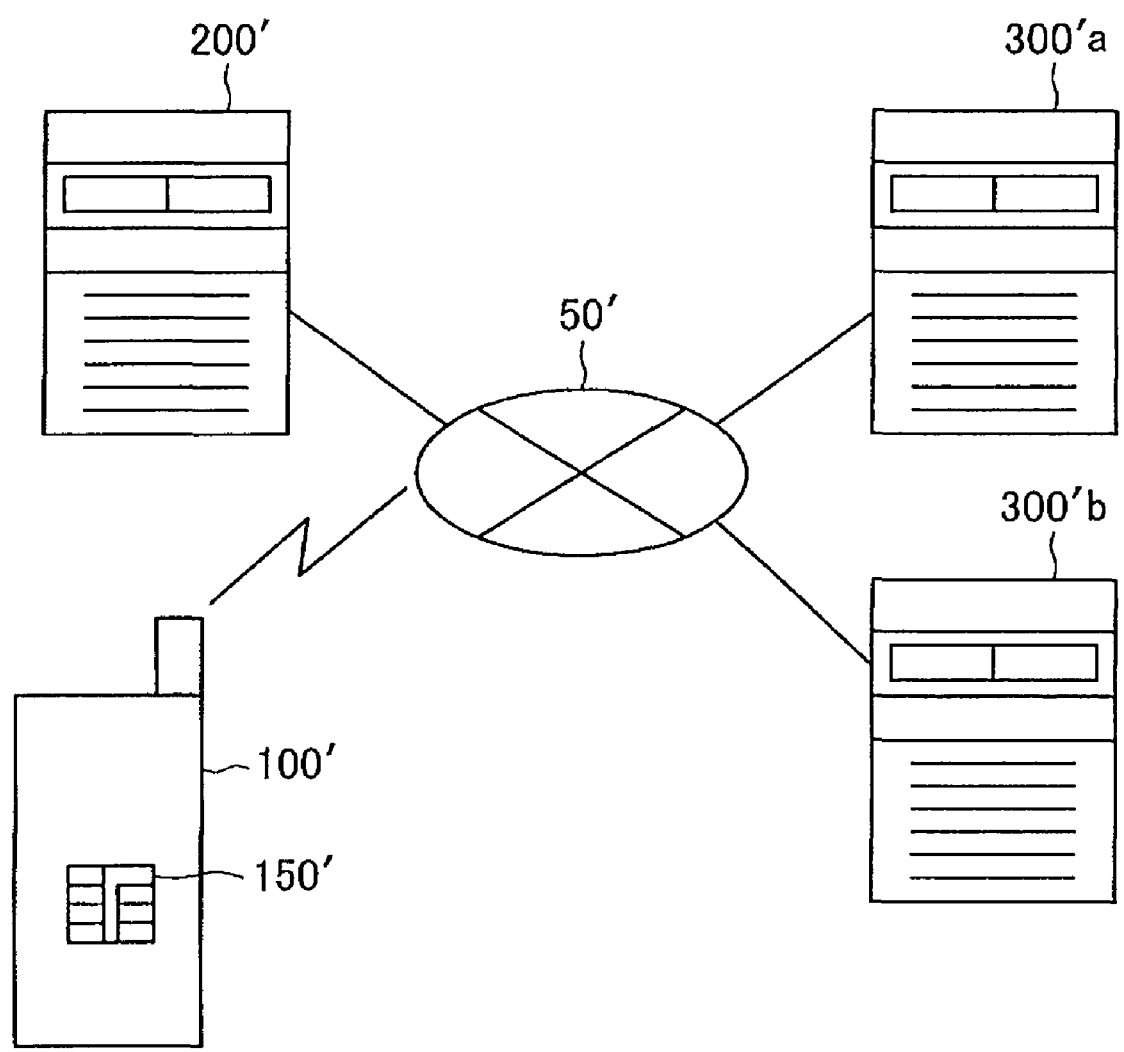
FIG. 7 is an explanatory view showing a configuration example of an information processing system according to a second embodiment of the present invention.

FIG. 7 is an explanatory view showing a configuration example of an information processing system 20 according to the present embodiment. As shown in FIG. 7, the information processing system 20 includes an information processing apparatus 100', a service providing server 200', a settlement operator server 300'*a*, a settlement operator server 300'*b* (hereinafter, the settlement operator server 300'*a* and the settlement operator server 300'*b* may generically be called settlement operator servers 300'), and a network 50'. The present embodiment is significantly different from the first embodiment in that a plurality of the settlement operator servers 300' is connected to the network 50' and information about the plurality of types of electronic money is displayed in order on the browser of the information processing apparatus 100' and thus, differences from the first embodiment will mainly be described below.

The information processing apparatus 100', the service providing server 200' and the settlement operator servers 300' are connected via the network 50'. The network 50' has approximately the same function as that of the network 50 in the first embodiment and thus, a detailed description thereof is omitted.

The information processing apparatus 100' is a mobile terminal on which an IC chip 150' is mounted. The information processing apparatus 100' has approximately the same function as that of the information processing apparatus 100 in the first embodiment, but is different in that the plurality of the settlement operator servers 300' is connected. Also, the information processing apparatus 100' is different from the information processing apparatus 100 in the first embodiment in that information about the plurality of types of electronic money is displayed in order on the browser thereof and this point will be described later. The IC chip 150' mounted on the information processing apparatus 100' has approximately the same function as that of the IC chip 150 in the first embodiment, but is different from the IC chip 150 in the first embodiment in that secure information concerning electronic value of the plurality of types of electronic money is recorded. The different point will be described in detail later.

The service providing server 200' has approximately the same function as that of the service providing server 200 in the first embodiment and thus, a detailed description thereof is omitted. The settlement operator server 300' has approximately the same function as that of the settlement operator server 300 in the first embodiment and thus, a detailed description thereof is omitted. According to the present embodiment, like the first embodiment, a script file for secure information access is acquired from the settlement operator server 300' based on location information contained in content data acquired from the service providing server 200' to access secure information based on a secure information access description of the script file. Accordingly, the script file for secure information access held by the settlement operator server 300' can be acquired and executed without applications being switched on the browser of the information processing apparatus 100'. Therefore, a starting time for starting up an application is made unnecessary so that processing from service provision such as Internet shopping to electronic money settlements can seamlessly be performed.

Further, according to the present embodiment, the service providing server 200' can use settlement processing by the plurality of the settlement operator servers 300' without constructing a service or a system in which applications corresponding to settlement processing by the plurality of the settlement operator servers 300' are embedded. Moreover, settlement processing by the plurality of settlement operator servers 300' can be performed without applications being switched on the browser of the information processing apparatus 100' and information about the plurality of types of electronic money can be displayed in order on the browser. This concludes an overview of the information processing system 20 according to the present embodiment.

Next, a detailed configuration of the information processing apparatus 100', the service providing server 200', and the settlement operator servers 300' of the information processing system 20 according to the present embodiment will be described. As described above, the information processing apparatus 100', the service providing server 200', and the settlement operator servers 300' have approximately the same functions as those of devices in the first embodiment and thus, functions that are different from those in the first embodiment will be described particularly in detail.

Figure 8:
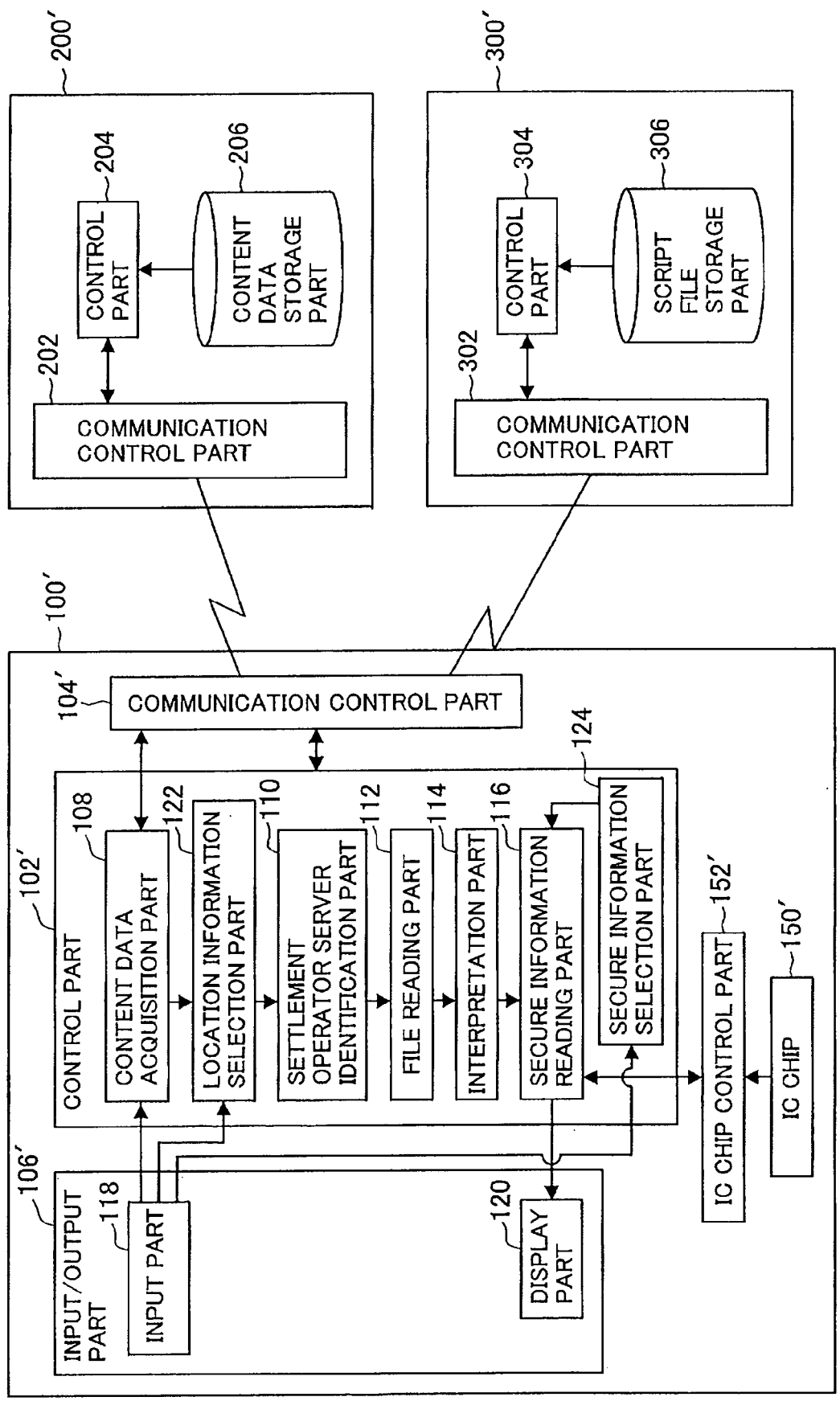
FIG. 8 is a block diagram showing the function configuration of the information processing apparatus, service providing server, and settlement operator server according to the second embodiment.

FIG. 8 is a block diagram showing the function configuration of the information processing apparatus 100', the service providing server 200', and the settlement operator servers 300'. As shown in FIG. 8, the information processing apparatus 100' includes a control part 102', a communication control part 104', an input/output part 106', the IC chip 150', and an IC chip control part 152'.

The control part 102' has a function to control the information processing apparatus 100' by a program in the information processing apparatus 100' and includes the content data acquisition part 108, the settlement operator server identification part 110, the file reading part 112, the interpretation part 114, the secure information reading part 116, a location information selection part 122, and a secure information selection part 124. The content data acquisition part 108, the settlement operator server identification part 110, the file reading part 112, the interpretation part 114, the secure information reading part 116 have the same functions as those in the first embodiment and thus, a detailed description thereof is omitted.

Like in the first embodiment, the content data acquisition part 108 acquires content data from the service providing server 200' and provides the content data to the location information selection part 122. The content data may contain location information of a plurality of script files. That is, content data provided by the service providing server 200' contains information to read script files of the plurality of the settlement operator servers 300' so that a plurality of types of electronic money can be used.

The location information selection part 122 has a function to select location information of one or more script files from location information of a plurality of script files contained in content data provided by the content data acquisition part 108. Location information may be selected by an entry of the user via the input part 118. The location information selection part 122 provides the selected location information to the settlement operator server identification part 110. Based on the location information of the settlement operator servers 300' provided by the location information selection part 122, the settlement operator server identification part 110 identifies the settlement operator servers 300'. The settlement operator server identification part 110 provides information about the identified settlement operator servers 300' to the file reading part 112.

The file reading part 112 has a function to read a script file from the settlement operator server 300' via the communication control part 104 based on information of the settlement operator server provided to the settlement operator server identification part 110. The file reading part 112 provides the read script file to the interpretation part 114.

The interpretation part 114 has a function to interpret a secure information access description contained in the script file. Then, the secure information reading part 116 has a function to read secure information from the IC chip 150' based on the secure information access description interpreted by the interpretation part 114. Secure information stored in the IC chip 150' is stored after being encrypted. Thus, the control part 102 is configured in such a way that secure information stored in the IC chip 150' may not be read without a function to decrypt encrypted secure information. A script file read from the settlement operator server 300' contains a secure information access description enabling access to secure information. Thus, secure information in the IC chip 150' can be accessed by interpreting and executing the secure information access description.

The secure information selection part 124 has a function to select one or more pieces of secure information from a plurality of pieces of secure information read by the secure information reading part 116 and displayed in the display part. In the present embodiment, the file reading part 112 reads a plurality of script files from the plurality of the settlement operator servers 300' and the plurality of script files is interpreted by the interpretation part 114. Then, because secure information about the plurality of types of electronic money is recorded in the IC chip 150', secure information recorded in the IC chip 150' is read based on a secure information access description enabling reading of each piece of secure information.

Secure information read by the secure information reading part 116 is displayed in the display part 120. The display part 120 is, for example, a browser of the information processing apparatus 100'. A plurality of pieces of secure information read by the secure information reading part 116 can be displayed in order on the browser of the information processing apparatus 100'. Displaying information in order on the browser of the information processing apparatus 100' means that the plurality of pieces of secure information is displayed simultaneously in a screen. Accordingly, for example, when articles are purchased, a user of the information processing apparatus 100' can perform settlement processing using a plurality of types of electronic money or one or more types among the of plurality of types of electronic money.

An IC chip control part 140' has a function to exchange data between the IC chip 150' and the control part 102' and the communication control part 104' of the information processing apparatus 100'. The IC chip 150' is mounted on the information processing apparatus 100', has a function to perform contact communication or non-contact communication with external devices, and is a secure memory having tamper-resistance. Secure information is recorded in the storage part of the IC chip 150'. The secure information may be secure information about a plurality of types of electronic money. When secure information about the plurality of types of electronic money is recorded in the IC chip 150', a user of the information processing apparatus 100' can perform settlement processing using the plurality of types of electronic money or the like.

The input/output part 106' is an interface of input and output provided with the information processing apparatus 100'. An input part 118 is an interface having a function to accept input and can exemplify, for example, a ten-key, buttons, or a touch-panel. A display part 120 is an output interface and can exemplify, for example, a display representation or a display device such as a lamp. As described above, a plurality of pieces of secure information, that is, information about a plurality of types of electronic money is displayed in order in the display part 120.

The service providing server 200' and the settlement operator servers 300' have functions similar to those of each device in the first embodiment and thus, a detailed description of the function configuration thereof is omitted. In the present embodiment, content data provided by the service providing server 200' contains location information of a plurality of script files for accessing secure information in the IC chip 150'. Based on the location information, the information processing apparatus 100' can read the script files from the settlement operator servers 300'. Since content data contains location information of the plurality of script files, as described above, the information processing apparatus 100' accesses a plurality of the settlement operator servers 300' to read the relevant script files. Accordingly, it becomes possible to use services from the service providing server 200' and to access secure information without applications being switched or screens being switched on the browser of the information processing apparatus 100'.

Further, the service providing server 200' can use settlement processing by the plurality of the settlement operator servers 300' without constructing a service or a system in which applications corresponding to settlement processing by the plurality of the settlement operator servers 300' are embedded. Moreover, settlement processing by the plurality of the settlement operator servers 300' can be performed without applications being switched on the browser of the information processing apparatus 100' and information about the plurality of types of electronic money can be displayed in order on the browser. This concludes a description of the function configuration of the information processing apparatus 100', the service providing server 200', and the settlement operator servers 300'.

Figure 9:
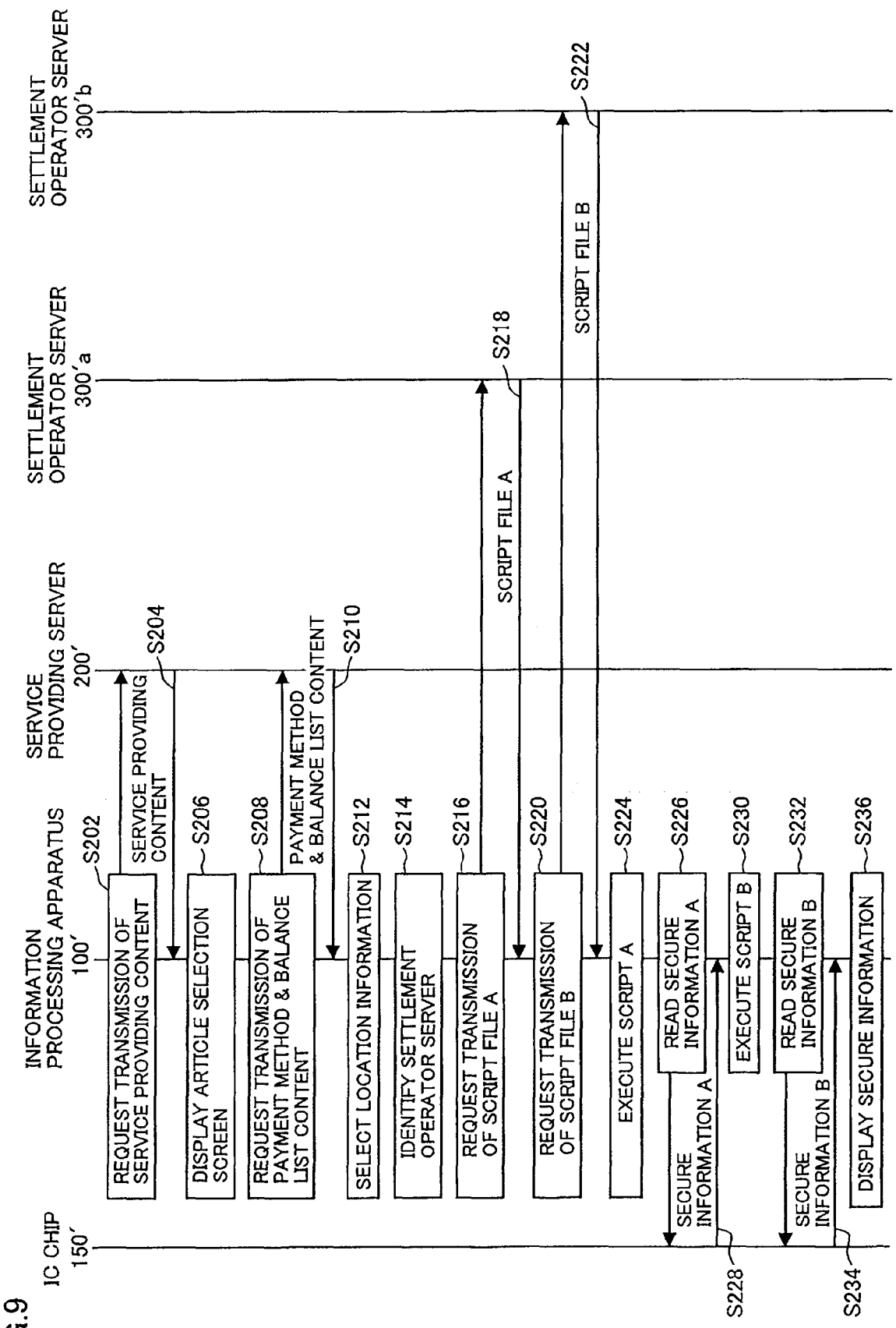
FIG. 9 is a timing chart showing the flow of processing from service provision to settlement completion according to the second embodiment.
Figure 10:
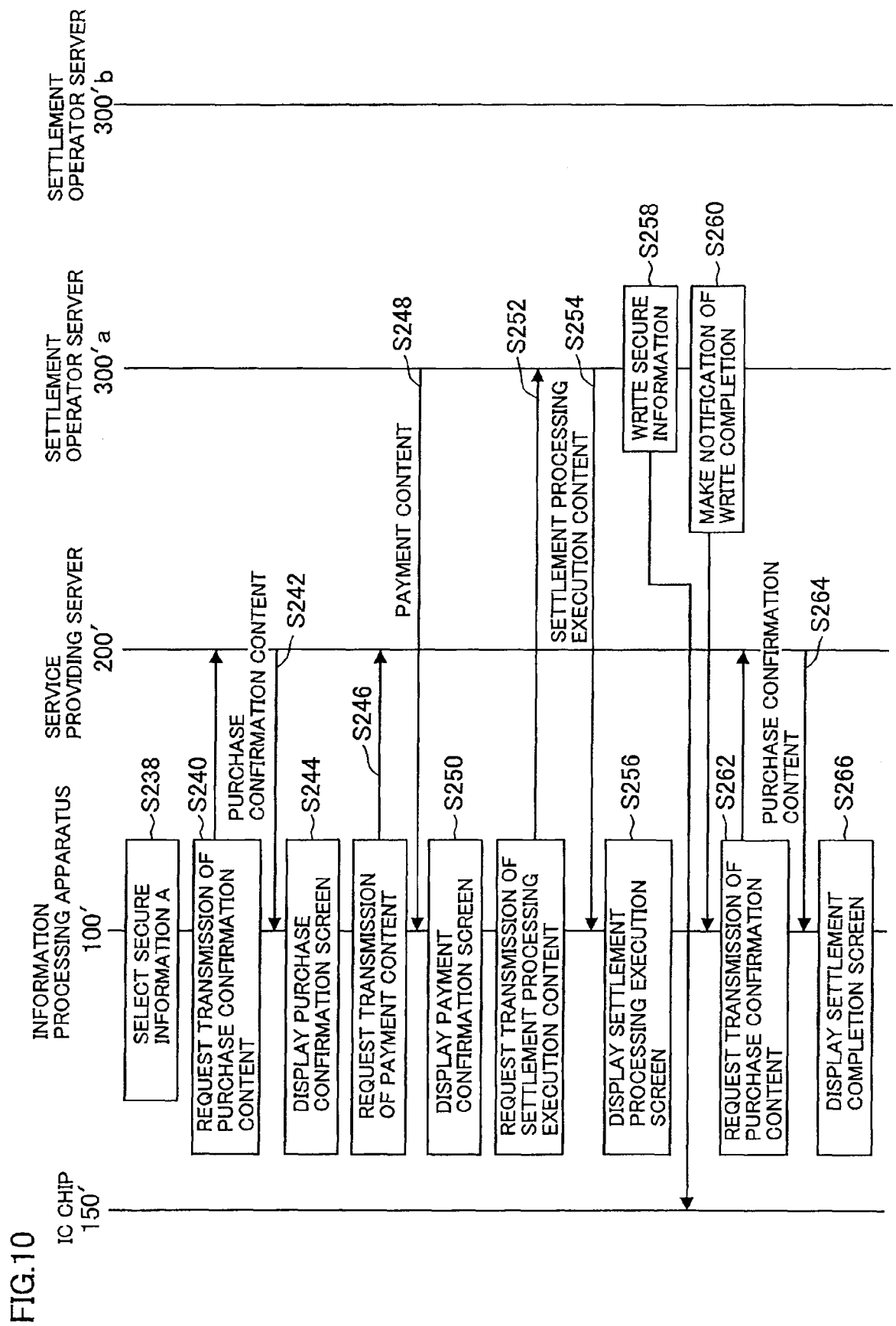
FIG. 10 is a timing chart showing the flow of processing from service provision to settlement completion according to the second embodiment.

Next, the flow of processing from service provision to settlement completion in the information processing system 20 will be described based on FIG. 9 and FIG. 10. FIG. 9 and FIG. 10 are timing charts showing the flow of processing from service provision to settlement completion in the information processing system 20. A case in which a user of the information processing apparatus 100' selects one settlement operator server 300' from a plurality of the settlement operator servers 300' to perform settlement processing will be described below. Processing similar to that in the first embodiment is omitted.

As shown in FIG. 9, the information processing apparatus 100' first requests transmission of service providing content from the service providing server 200' (S202). The service providing server 200', from which transmission of service providing content is requested by the information processing apparatus 100' at step S202, acquires the requested service providing content from the content data storage part 206 and provides the service providing content to the information processing apparatus 100' (S204). The information processing apparatus 100', to which content data is provided at step S204, displays an article selection screen in the display part 120 (S206).

Next, the information processing apparatus 100' requests transmission of payment method and balance list content from the service providing server 200' (S208). The service providing server 200', from which transmission of content data is requested by the information processing apparatus 100' at step S208, acquires the requested content data from the content data storage part 206 and provides the content data to the information processing apparatus 100' (S210). The content data provided to the information processing apparatus 100' at step S210 contains location information of a plurality of script files enabling reading of secure information in the IC chip 150' of the information processing apparatus 100'.

The information processing apparatus 100' selects one piece of location information of a plurality of script files contained in the content data provided at step S210 (S212). The selection of location information at step S212 may be made in accordance with an entry of payment method selection by the user, pre-set the location information to be selected, or be made in accordance with the type of the secure information recorded in the IC chip 150'. A case in which one piece of location information is selected in accordance with the entry of payment method selection by the user will be described below.

The information processing apparatus 100' identifies the settlement operator server 300' in accordance with the location information selected at step S212 (S214). Then, the information processing apparatus 100' requests transmission of a script file from the settlement operator server 300' identified at step S214 (S216). The settlement operator server 300', from which transmission of the script file is requested by the information processing apparatus 100' at step S216, provides the script file recorded in the script file storage part 306 to the information processing apparatus 100' (S218). The information processing apparatus 100', to which the script file is provided at step S218, executes the script (S220).

The information processing apparatus 100', which executes the script at step S220, interprets a secure information access description contained in the script file to read secure information in the IC chip 150' (S226). The information processing apparatus 100', which reads secure information in the IC chip 150' at step S226, acquires the secure information from the IC chip 150' (S228). The information processing apparatus 100', which acquires the secure information at step S228, displays the secure information on the browser (S236).

Next, as shown in FIG. 10, if a plurality of pieces of secure information is displayed at step S236, secure information A is selected from the displayed secure information (S238). If one piece of location information is selected at step S212, a script file is acquired in accordance with the location information and secure information accessible by the acquired script file is displayed on the browser. In this case, only one piece of secure information is displayed on the browser and thus, there is no need to select secure information. However, if a plurality of pieces of location information is selected at step S212, a plurality of pieces of secure information is displayed on the browser. In this case, one piece of secure information is selected from the plurality of pieces of secure information.

Then, the information processing apparatus 100' requests transmission of purchase confirmation content to check with the user to confirm the purchase (S240). The service providing server 200', from which transmission of purchase confirmation content is requested by the information processing apparatus 100' at step S240, transmits purchase confirmation content recorded in the content data storage part 206 to the information processing apparatus 100' (S242). The information processing apparatus 100', to which purchase confirmation content is transmitted by the service providing server 200' at step S242, displays a purchase confirmation screen on the browser (S244).

Then, the information processing apparatus 100' requests transmission of payment content from the settlement operator server 300' (S246). The settlement operator server 300', from which transmission of payment content is requested at step S246, provides payment content to the information processing apparatus 100' (S248). The information processing apparatus 100', to which payment content is provided by the settlement operator server 300' at step S248, displays a payment confirmation screen on the browser (S250).

Then, the information processing apparatus 100' requests transmission of settlement processing execution content from the settlement operator server 300' (S252). The settlement operator server 300', from which transmission of settlement processing execution content is requested at step S252, provides settlement processing execution content to the information processing apparatus 100' (step S254). The information processing apparatus 100', to which settlement processing execution content is provided by the settlement operator server 300' at step S254, displays a settlement processing execution screen on the browser (S256).

The settlement operator server 300', which transmits settlement processing execution content to the information processing apparatus 100' at step S254, writes secure information into the IC chip 150' (S258). The writing of secure information performed at step S258 is an update of electronic money or the like and settlement processing is thereby performed. Then, the settlement operator server 300' notifies the information processing apparatus 100' that the writing of secure information has been completed (S260).

The information processing apparatus 100' notified of completion of the writing of secure information at step S260 requests transmission of purchase confirmation content from the service providing server 200' (S262). The service providing server 200', from which transmission of purchase confirmation content is requested by the information processing apparatus 100' at step S262, transmits purchase confirmation content to the information processing apparatus 100' (S264). The information processing apparatus 100', to which purchase confirmation content is transmitted at step S264, displays a settlement completion screen on the browser (S266). This concludes a description of the flow of processing from service provision to settlement completion in the information processing system 20.

Figure 11:
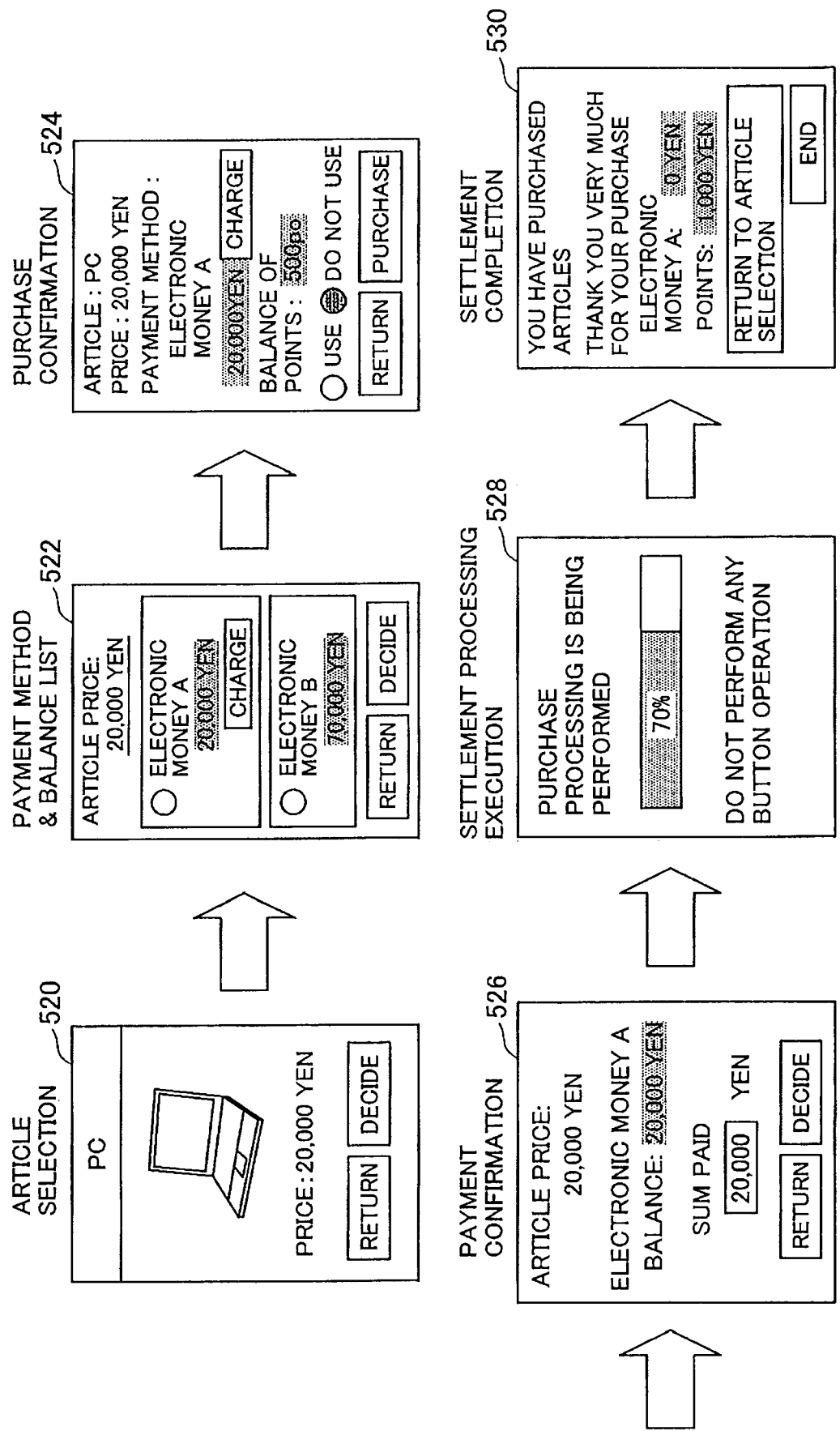
FIG. 11 is an explanatory view illustrating the display screen displayed on the browser of the information processing apparatus according to the second embodiment.

Next, display screens displayed in the display part 120 (browser) of the information processing apparatus 100' will be described based on FIG. 11. FIG. 11 is an explanatory view illustrating the display screens displayed on the browser of the information processing apparatus 100'. Service providing content such as Internet shopping is displayed on the browser of the information processing apparatus 100' and an article selection screen 520 is displayed. In the article selection screen 520, for example, images of PCs to be articles for selection, prices of PCs and the like are displayed.

If, after the article selection screen 520 being displayed, an entry to decide purchase of an article is made by an entry of a user of the information processing apparatus 100', a payment method and balance list screen 522 is displayed. The payment method is, for example, the type of electronic money, and the type of electronic money used by the user and the balance of the electronic money are displayed. If, after the payment method and balance list screen 522 being displayed, a decision entry of the payment method is made by an entry of the user, a purchase confirmation screen 524 is displayed. In the purchase confirmation screen 524, for example, the name of an article, price of the article, payment method and the like are displayed. If, in addition to electronic money, points, coupons and the like are used, the balance of points and the like are displayed.

If, after the purchase confirmation screen 524 being displayed, an entry to decide purchase is made by an entry of the user, a payment confirmation screen 526 is displayed. In the payment confirmation screen 526, for example, the price of an article, type of electronic money to be used, balance of the electronic money, sum paid and the like are displayed. If, after the payment confirmation screen 526 being displayed, an entry to decide payment confirmation is made by an entry of the user, a settlement processing execution screen 528 is displayed. In the settlement processing execution screen 528, execution progress of purchase processing, warnings against entries by the user and the like are displayed.

When settlement processing is completed, a settlement completion screen 530 is displayed. In the settlement completion screen 530, a display that an article has been purchased is made and also the balance of electronic money, balance of points and the like are displayed to notify the user that payments are completed. This concludes a description of display screens displayed in the display part 120 of the information processing apparatus 100'.

Figure 12:
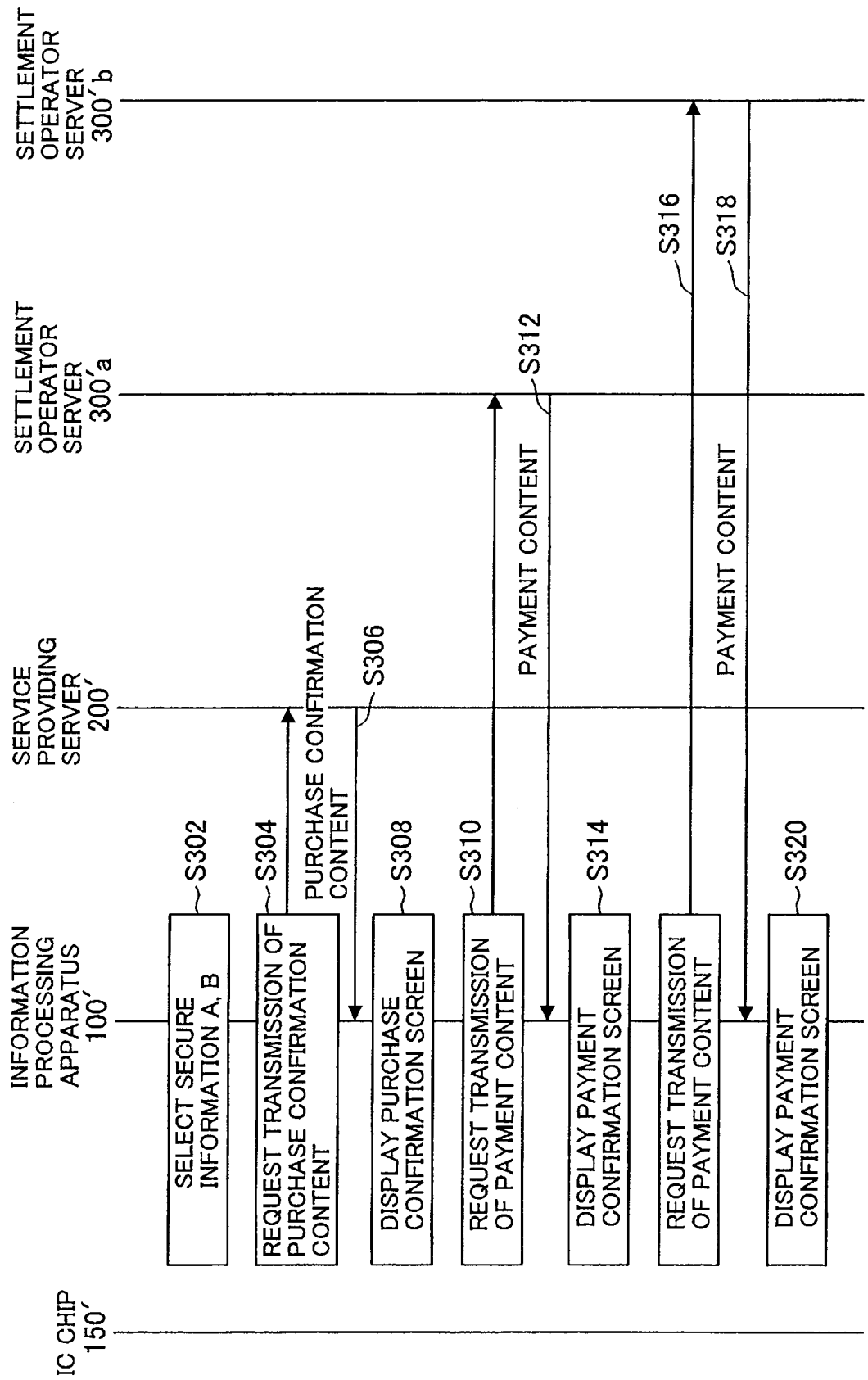
FIG. 12 is a timing chart showing the flow of processing from secure information selection to settlement completion according to the second embodiment.
Figure 13:
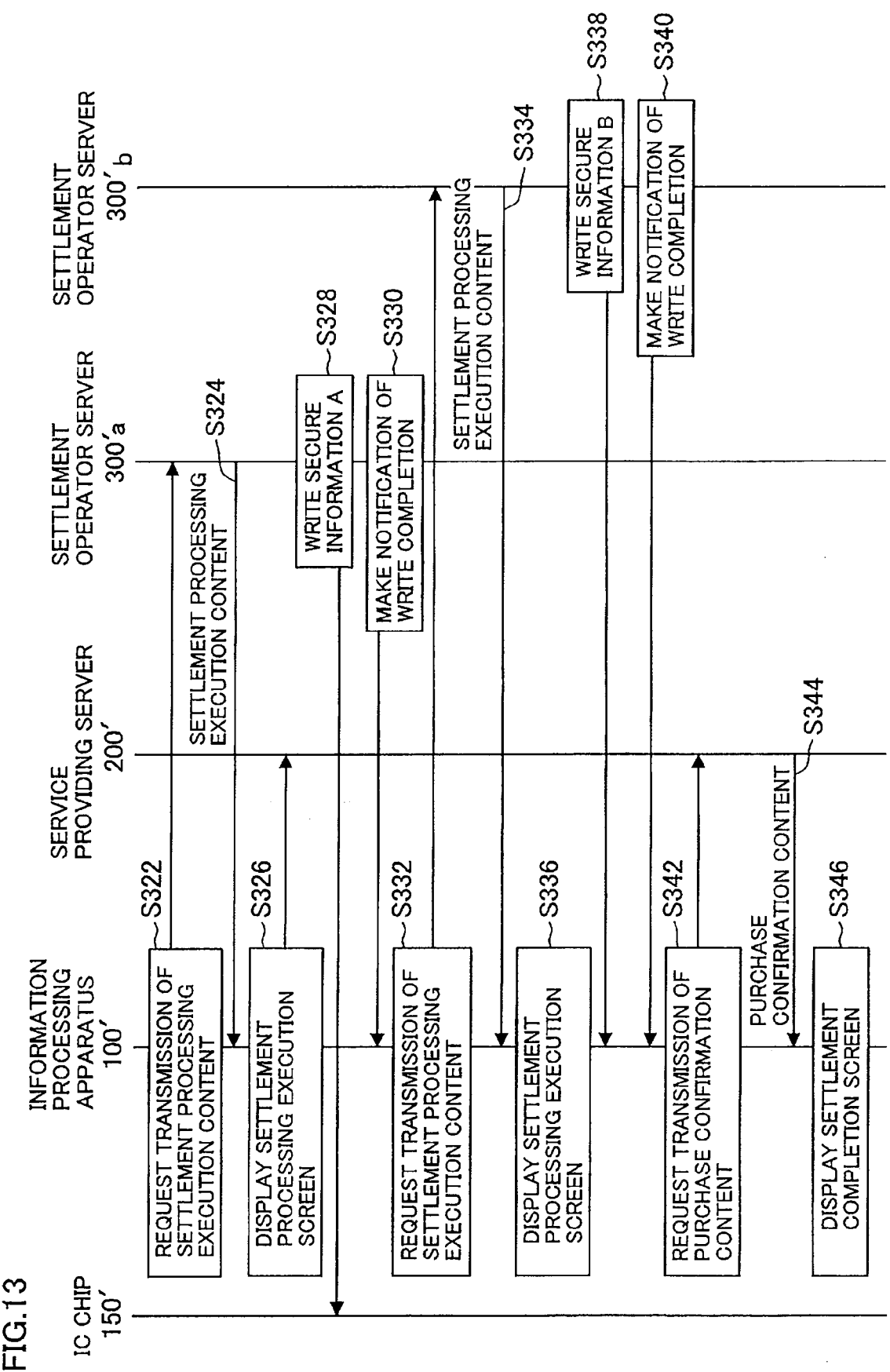
FIG. 13 is a timing chart showing the flow of processing from secure information selection to settlement completion according to the second embodiment.

In the foregoing, an embodiment of the information processing system 20 according to the second embodiment has been described. Next, a case in which settlement processing is performed by selecting two or more pieces of secure information from a plurality of pieces of secure information displayed on the browser of the information processing apparatus 100' will be described based on FIG. 12 to FIG. 15. FIG. 12 and FIG. 13 are timing charts showing the flow of processing from secure information selection to settlement completion in the information processing system 20. As shown in FIG. 12, the information processing apparatus 100' selects secure information A and secure information B from the plurality of pieces of displayed secure information (S302). The selection of secure information at step S302 may be made based on an entry of the user or preset. Or, the selection may be made based on secure information recorded in the IC chip 150'.

The information processing apparatus 100' requests transmission of purchase confirmation content to check with the user to confirm the purchase (S304). The service providing server 200', from which transmission of purchase confirmation content is requested by the information processing apparatus 100' at step S304, transmits purchase confirmation content recorded in the content data storage part 206 to the information processing apparatus 100' (S306). The information processing apparatus 100', to which purchase confirmation content is transmitted by the service providing server 200' at step S306, displays a purchase confirmation screen on the browser (S308).

Then, the information processing apparatus 100' requests transmission of payment content from the settlement operator server 300'a (S310). The settlement operator server 300'a, from which transmission of payment content is requested at step S310, provides payment content to the information processing apparatus 100' (S312). The information processing apparatus 100', to which payment content is provided by the settlement operator server 300'a at step S312, displays a payment confirmation screen on the browser (S314).

The information processing apparatus 100' also requests transmission of payment content from the settlement operator server 300'b (S316). The settlement operator server 300'b, from which transmission of payment content is requested at step S316, provides payment content to the information processing apparatus 100' (S318). The information processing apparatus 100', to which payment content is provided by the settlement operator server 300'b at step S318, displays a payment confirmation screen on the browser (S320).

Then, the information processing apparatus 100' requests transmission of settlement processing execution content from the settlement operator server 300'a (S322). The settlement operator server 300'a, from which transmission of settlement processing execution content is requested at step S322, provides settlement processing execution content to the information processing apparatus 100' (step S324). The information processing apparatus 100', to which settlement processing execution content is provided by the settlement operator server 300'a at step S324, displays a settlement processing execution screen on the browser (S326).

The settlement operator server 300'a, which transmits settlement processing execution content to the information processing apparatus 100' at step S324, writes the secure information A into the IC chip 150' (S328). The writing of the secure information performed at step S328 is an update of electronic money or the like and settlement processing is thereby performed. Then, the settlement operator server 300'a notifies the information processing apparatus 100' that the writing of secure information has been completed (S330).

The information processing apparatus 100' also requests transmission of settlement processing execution content from the settlement operator server 300'b (S332). The settlement operator server 300'b, from which transmission of settlement processing execution content is requested at step S332, provides settlement processing execution content to the information processing apparatus 100' (step S334). The information processing apparatus 100', to which settlement processing execution content is provided by the settlement operator server 300'b at step S334, displays a settlement processing execution screen on the browser (S336).

The settlement operator server 300'b, which transmits settlement processing execution content to the information processing apparatus 100' at step S334, writes the secure information B into the IC chip 150' (S338). The writing of the secure information performed at step S338 is an update of electronic money or the like and settlement processing is thereby performed. Then, the settlement operator server 300'b notifies the information processing apparatus 100' that the writing of secure information has been completed (S340).

The information processing apparatus 100' notified of completion of the writing of secure information at step S340 requests transmission of purchase confirmation content from the service providing server 200' (S342). The service providing server 200', from which transmission of purchase confirmation content is requested by the information processing apparatus 100' at step S342, transmits purchase confirmation content to the information processing apparatus 100' (S344). The information processing apparatus 100', to which purchase confirmation content is transmitted at step S344, displays a settlement completion screen on the browser (S346). This concludes a description of the flow of processing from service provision to settlement completion in the information processing system 20.

Next, display screens displayed in the display part 120 (browser) of the information processing apparatus 100' will be described based on FIG. 14 and FIG. 15. FIG. 14 and FIG. 15 are explanatory views illustrating the display screens displayed on the browser of the information processing apparatus 100'. Service providing content such as Internet shopping is displayed on the browser of the information processing apparatus 100' and an article selection screen 540 is displayed. In the article selection screen 540, for example, images of PCs to be articles for selection, prices of PCs and the like are displayed.

If, after the article selection screen 540 being displayed, an entry to decide purchase of an article is made by an entry of a user of the information processing apparatus 100', a payment method and balance list screen 542 is displayed. The payment method is, for example, the type of electronic money, and the type of electronic money used by the user and the balance of the electronic money are displayed. If, after the payment method and balance list screen 542 being displayed, a decision entry of the payment method is made by an entry of the user, a purchase confirmation screen 544 is displayed. In the purchase confirmation screen 544, for example, the name of an article, price of the article, payment method and the like are displayed. If, in addition to electronic money, points, coupons and the like are used, the balance of points and the like are displayed. If, for example, both the electronic money A and the electronic money B are selected by an entry of the user, the electronic money A and the electronic money B are displayed as the payment method in the purchase confirmation screen 544 and also sums to be charged are displayed separately.

If, after the purchase confirmation screen 544 being displayed, an entry to decide purchase is made by an entry of the user, a payment confirmation screen 546 is displayed. If both the electronic money A and the electronic money B are used for settlement, after the payment confirmation screen 546 of the electronic money A being displayed, a payment confirmation screen 548 of the electronic money B is displayed. In the payment confirmation screens 546 and 548, for example, the price of an article, types of electronic money to be used, balances of the electronic money, sum paid and the like are displayed. If, after the payment confirmation screens 546 and 548 being displayed, an entry to decide payment confirmation is made by an entry of the user, settlement processing execution screens 550 and 552 are displayed. In the settlement processing execution screens 550 and 552, execution progress of purchase processing, warnings against entries by the user and the like are displayed.

When settlement processing is completed, a settlement completion screen 554 is displayed. In the settlement completion screen 554, a display that an article has been purchased is made and also the balances of electronic money, balances of points and the like are displayed to notify the user that payments are completed. This concludes a description of display screens displayed in the display part 120 of the information processing apparatus 100'.

In the foregoing, an example of the information processing system 20 according to the second embodiment has been described. In the present embodiment, content data provided by the service providing server 200' contains location information of a plurality of script files for accessing secure information in the IC chip 150'. Based on the location information, the information processing apparatus 100' can read the script files from the settlement operator servers 300'. Since content data contains location information of the plurality of script files, as described above, the information processing apparatus 100' accesses a plurality of the settlement operator servers 300' to read the relevant script files. Accordingly, it becomes possible to use services from the service providing server 200' and to access secure information without applications being switched or screens being switched on the browser of the information processing apparatus 100'.

Further, the service providing server 200' can use settlement processing by the plurality of the settlement operator servers 300' without constructing a service or a system in which applications corresponding to settlement processing by the plurality of the settlement operator servers 300' are embedded. Moreover, settlement processing by the plurality of the settlement operator servers 300' can be performed without applications being switched on the browser of the information processing apparatus 100' and information about the plurality of types of electronic money can be displayed in order on the browser.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus on which an IC chip in which secure information is recorded is mounted and which is connected to a service providing server for providing a service and a settlement operator server for executing a settlement concerning the service via a network, the information processing apparatus comprising:
    a content data acquisition part that acquires content data containing a network location of a script file capable of reading the secure information in the IC chip from the service providing server, that transmits to the network location a request for the script file, and that acquires the script file from the settlement operator server based on the request;
    a file reading part configured to read the script file acquired by the content data acquisition part; and
    a secure information reading part that reads the secure information from the IC chip based on a secure information access description contained in the script file read by the file reading part.

2. The information processing apparatus according to claim 1, further comprising:
    a display part that displays the secure information in the IC chip read by the secure information reading part.

3. The information processing apparatus according to claim 1, further comprising:
    an interpretation part configured to interpret the secure information access description contained in the script file, wherein the secure information reading part reads the secure information from the IC chip based on an interpretation of the secure information access description by the interpretation part.

4. The information processing apparatus according to claim 1, further comprising:
    a settlement operator server identification part configured to identify the settlement operator server on which the script file is stored from the network location of the script file contained in the content data acquired by the content data acquisition part.

5. An information processing method of an information processing apparatus on which an IC chip in which secure information is recorded is mounted and which is connected to a service providing server for providing a service and a settlement operator server for executing a settlement concerning the service via a network, the information processing method comprising:
    acquiring content data containing a network location of a script file capable of reading the secure information in the IC chip from the service providing server;
    transmitting to the network location a request for the script file;
    acquiring the script file from the settlement operator server based on the request;
    reading the script file from the settlement operator server; and
    reading the secure information from the IC chip based on a secure information access description contained in the read script file.

6. A computer-readable storage medium encoded with a program for causing a computer to perform a method as an information processing apparatus on which an IC chip in which secure information is recorded is mounted and which is connected to a service providing server for providing a service and a settlement operator server for executing a settlement concerning the service via a network, the method comprising:
    acquiring content data containing a network location of a script file capable of reading the secure information in the IC chip from the service providing server;
    transmitting to the network location a request for the script file;
    acquiring the script file from the settlement operator server based on the request;
    reading the script file from the settlement operator server; and
    reading the secure information from the IC chip based on a secure information access description contained in the script file.

7. A settlement system, comprising:
    an information processing apparatus on which an IC chip in which secure information is recorded is mounted, a service providing server for providing a service, and a settlement operator server for executing a settlement concerning the service connected via a network,
    the service providing server comprising
        a content data providing part that provides content data containing a network location of a script file capable of reading the secure information in the IC chip to the information processing apparatus in accordance with a request of the information processing apparatus,
    the information processing apparatus comprising
        a content data acquisition part that acquires the content data provided by the content data providing part, that transmits to the network location a script request for the script file, and that acquires the script file from the settlement operator server based on the script request;
        a file reading part configured to read the script file acquired by the content data acquisition part; and
        a secure information reading part that reads the secure information from the IC chip based on a secure information access description contained in the script file read by the file reading part,
    the settlement operator server comprising
        a secure information update part that updates the secure information read by the secure information reading part.

8. An information processing apparatus on which an IC chip in which secure information is recorded is mounted and which is connected to a service providing server for providing a service and a plurality of settlement operator servers for executing a settlement concerning the service via a network, the information processing apparatus comprising:
    a content data acquisition part that acquires content data containing network locations of a plurality of script files capable of reading the secure information in the IC chip from the service providing server, that transmits to the network locations requests for the plurality of script files, and that acquires the plurality of script files from the plurality of settlement operator servers based on the requests;

a file reading part configured to read the plurality of script files acquired by the content data acquisition part;

a secure information reading part that reads the secure information from the IC chip based on a secure information access description contained in the plurality of script files read by the file reading part; and a display part that displays the secure information read by the secure information reading part in one screen in order.

9. The information processing apparatus according to claim 8, further comprising:

a location information selection part that selects the network location of one or more of the script files from the network locations of the plurality of script files contained in the content data in accordance with an entry, wherein the file reading part reads the secure information from the IC chip based on the network location of the one or more of the script files selected by the location information selection part.

10. The information processing apparatus according to claim 8, wherein the secure information is updatable by the plurality of settlement operator servers, and the information processing apparatus further comprises a secure information selection part that selects secure information from the secure information displayed in the display part in accordance with an entry.

11. An information processing method of an information processing apparatus on which an IC chip in which secure information is recorded is mounted and which is connected to a service providing server for providing a service and a plurality of settlement operator servers for executing a settlement concerning the service via a network, the information processing method comprising:

acquiring content data containing network locations of a plurality of script files capable of reading the secure information in the IC chip from the service providing server;

transmitting to the network locations requests for the plurality of script files;

acquiring the plurality of script files from the plurality of settlement operator servers based on the requests;

reading the plurality of script files from the plurality of settlement operator servers;

reading the secure information from the IC chip based on a secure information access description contained in the plurality of read script files; and displaying the read secure information in one screen in order.

12. A computer-readable storage medium encoded with a program for causing a computer to perform a method as an information processing apparatus on which an IC chip in which secure information is recorded is mounted and which is connected to a service providing server for providing a service and a plurality of settlement operator servers for executing a settlement concerning the service via a network, the method comprising:

acquiring content data containing network locations of a plurality of script files capable of reading the secure information in the IC chip from the service providing server;

transmitting to the network locations requests for the plurality of script files;

acquiring the plurality of script files from the plurality of settlement operator servers based on the requests;

reading the plurality of script files from the plurality of settlement operator servers;

the secure information from the IC chip based on a secure information access description contained in the plurality of script files; and displaying the secure information in one screen in order.

13. A settlement system, comprising:

an information processing apparatus on which an IC chip in which secure information is recorded is mounted, a service providing server for providing a service, and a plurality of settlement operator servers for executing a settlement concerning the service connected via a network, the service providing server comprising
a content data providing part that provides content data containing network locations of a plurality of script files capable of reading the secure information in the IC chip to the information processing apparatus in accordance with a request of the information processing apparatus, the information processing apparatus comprising
a content data acquisition part that acquires the content data provided by the content data providing part, that transmits to the network locations script requests for the plurality of script files, and that acquires the plurality of script files from the plurality of settlement operator servers based on the script requests;

a file reading part configured to read the plurality of script files acquired by the content data acquisition part;

a secure information reading part that reads the secure information from the IC chip based on a secure information access description contained in the plurality of script files read by the file reading part, and a display part that displays the secure information read by the secure information reading part in one screen in order, the settlement operator servers comprising
a secure information update part that updates the secure information selected in accordance with an entry from the secure information displayed in the display part.

* * * * *